US008976953B2

(12) United States Patent
Peterson

(10) Patent No.: US 8,976,953 B2
(45) Date of Patent: Mar. 10, 2015

(54) SYSTEMS AND METHODS OF CONTROLLING CONFIDENTIAL COMMUNICATION IN CONTACT HANDLING SYSTEMS

(75) Inventor: David O. Peterson, Lehi, UT (US)

(73) Assignee: inContact, Inc., Midvale, UT (US)

( * ) Notice: Subject to any disclaimer, the term of this patent is extended or adjusted under 35 U.S.C. 154(b) by 92 days.

(21) Appl. No.: 13/345,511

(22) Filed: Jan. 6, 2012

(65) Prior Publication Data

US 2013/0129069 A1 May 23, 2013

Related U.S. Application Data

(63) Continuation of application No. 13/302,974, filed on Nov. 22, 2011.

(51) Int. Cl.
| | | |
|---|---|---|
| *H04M 3/00* | (2006.01) | |
| *H04M 5/00* | (2006.01) | |
| *H04M 11/00* | (2006.01) | |
| *H04M 3/51* | (2006.01) | |
| *H04M 7/00* | (2006.01) | |

(52) U.S. Cl.
CPC .......... *H04M 3/5141* (2013.01); *H04M 3/5183* (2013.01); *H04M 3/5191* (2013.01); *H04M 7/0027* (2013.01); *H04M 3/5166* (2013.01)
USPC ............... 379/265.02; 379/88.13; 379/265.09

(58) Field of Classification Search
CPC   H04M 3/5183;  H04M 3/5191;  H04M 7/0027
USPC ................ 379/88.13, 265.01, 265.02, 265.09
See application file for complete search history.

(56) References Cited

U.S. PATENT DOCUMENTS

| | | | | |
|---|---|---|---|---|
| 6,401,066 | B1 * | 6/2002 | McIntosh ....................... | 704/273 |
| 6,862,343 | B1 * | 3/2005 | Vacek et al. ............... | 379/88.22 |
| 7,370,349 | B2 * | 5/2008 | Holvey et al. ..................... | 726/5 |
| 7,792,278 | B2 * | 9/2010 | Watson et al. ............. | 379/266.1 |
| 8,275,115 | B1 * | 9/2012 | Everingham et al. .... | 379/265.02 |
| 8,438,314 | B2 * | 5/2013 | Bateman et al. .................. | 710/5 |

(Continued)

FOREIGN PATENT DOCUMENTS

WO         WO 0128154  A1  *   4/2001

OTHER PUBLICATIONS

U.S. Appl. No. 13/345,517, filed Jan. 6, 2012.

(Continued)

*Primary Examiner* — Ahmad F Matar
*Assistant Examiner* — Nafiz E Hoque
(74) *Attorney, Agent, or Firm* — Maschoff Brennan

(57) ABSTRACT

Methods and apparatus for improving confidentiality of sensitive information received from a customer in a contact handling system including an agent are disclosed. The method can include opening a first connection path between the customer and the contact handling system. The method can include making communication sent by the customer through the first connection path available to the agent. The method can include opening a second connection path between the customer and the contact handling system as the agent and customer communicate over the first connection path. The method can include preventing the agent from accessing communication sent over the second communication path. The method can include receiving sensitive information through the second communication path.

19 Claims, 13 Drawing Sheets

(56) References Cited

U.S. PATENT DOCUMENTS

| | | | |
|---|---|---|---|
| 8,462,920 B2* | 6/2013 | Gonen et al. | 379/93.12 |
| 2002/0107906 A1* | 8/2002 | Brockbank | 709/203 |
| 2007/0160054 A1* | 7/2007 | Shaffer et al. | 370/395.2 |
| 2010/0310059 A1* | 12/2010 | Davis et al. | 379/88.18 |
| 2012/0027195 A1* | 2/2012 | Shaffer et al. | 379/265.09 |

OTHER PUBLICATIONS

U.S. Appl. No. 13/345,505, filed Jan. 6, 2012.
U.S. Appl. No. 13/345,559, filed Jan. 6, 2012.
U.S. Appl. No. 13/302,974, filed Nov. 22, 2011.
U.S. Appl. No. 13/345,561, filed Jan. 6, 2012.

* cited by examiner

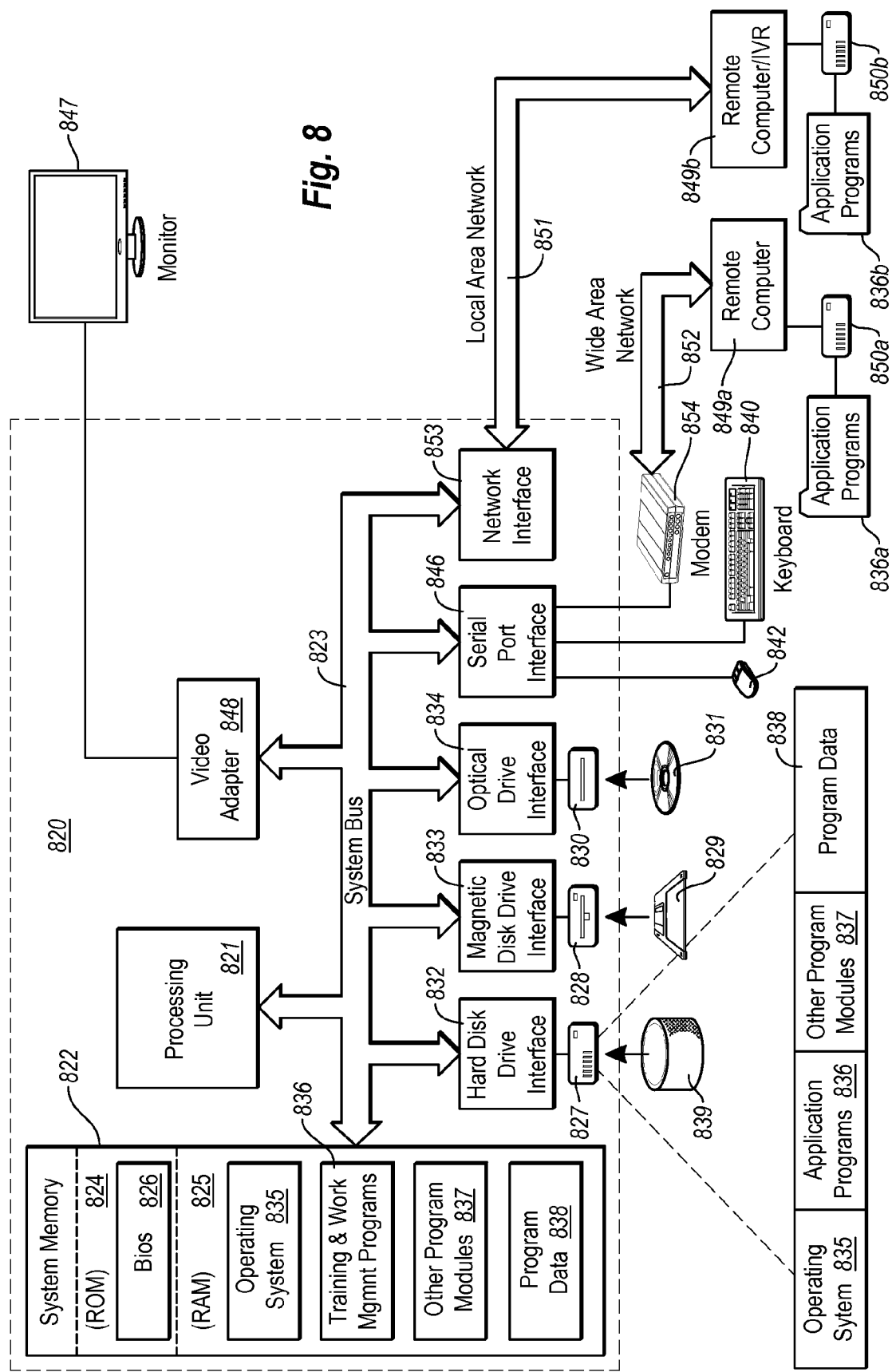

SYSTEMS AND METHODS OF CONTROLLING CONFIDENTIAL COMMUNICATION IN CONTACT HANDLING SYSTEMS

CROSS REFERENCE TO RELATED APPLICATIONS

This application is a continuation of U.S. patent application Ser. No. 13/302,974 entitled "SYSTEMS AND METHODS OF INTRODUCING BENEFICIAL COMMUNICATION LATENCY IN CONTACT HANDLING SYSTEMS" filed on Nov. 22, 2011, the contents of which are incorporated herein by reference.

BACKGROUND OF THE INVENTION

1. The Field of the Invention

The present disclosure relates generally to remote communication. More specifically, the disclosure relates to systems and methods of improving communication in a contact handling system between company agents and the customers with which the agents interact.

2. The Relevant Technology

Contact handling systems often act as communication intermediaries between companies and members of the public—often customers or potential customers. The communication may be initiated through inbound or outbound communication and can take place through: call centers, phone lines, facsimile, email, instant messaging (chat), short message service (SMS) messaging, Voice over Internet Protocol (VoIP), webcams, face-to-face communication with an agent, and other channels.

Traditional inbound communications to call centers often are made by persons seeking information, asking for help, or desiring to purchase products or services. Call centers also often initiate outbound communications to customers or potential customers to solicit new business, collect on overdue payments, or gather feedback. For purposes of this application, a customer is a person, device or automaton that contacts, attempts to contact, or is contacted by a call center or contact center for informational, educational, emergency, governmental, commercial, etc. purpose. A contact is the computer data that promotes and tracks the interaction of a customer with the contact handling system, regardless of the type of media involved (phone, email, SMS, etc.).

The traditional mode of customer communication employed by call centers world-wide has been the ubiquitous telephone call, often using the ordinary copper-based "landline."

The ability for facsimile (aka fax) machines to transmit images over ordinary telephone lines has allowed customers to send documents to, or receive documents from, the contact handling system.

With the advent of the personal computer, contact handling systems were able to offer email capabilities. By the use of automated replies or pre-defined text fragments, contact handling systems were able to communicate with customers who did not expect or demand immediate information or problem resolution.

After the advent of the computer, the coming of the World-Wide Web brought the ability for a customer to enter a "Live Chat" with a contact handling system agent by clicking on a specified link on a web page. After some delay, characters typed at the computer appear to the contact handling system agent, who responds with questions or information. This exchange of messages is often time-delayed on one or both ends, with the expectation that interactions may be delayed, but for no more than a few minutes.

Mobile phones introduced the Short Message Service (SMS) as a communications tool for contact handling systems. SMS message exchanges resemble "chat" in many ways, except that the length of the messages may be constrained (often to 140 characters or less) and the expectation of intra-message exchange times may be in hours or even days. Software is available to allow personal computers to send and receive SMS messages.

Voice over Internet Protocol (Voice over IP, or VoIP) added the capability for people to use computing devices for exchanging voice communications over the internet. This capability may be achieved using VoIP-specific hardware. Additionally, software on personal computers allows people to make telephone calls to others, including contact handling systems, using common audio inputs (such as a microphone) and outputs (speakers or headphones) available on most personal computers. Such software is commonly referred to as a "Soft Phone," since it offers the functions of a telephone via software rather than through dedicated telephony hardware. Performance and expectations are nearly the same for VoIP calls as for the traditional "landline", except that voice quality and increased propagation delay may detract from the user experience.

Inexpensive digital video cameras, often called "Webcams" were introduced for personal computers to enrich the personal interaction between caller and called party, and combine the video feed with microphone audio to enable inexpensive videoconferencing. This highly-interactive arrangement has also been made available by some contact handling systems as an option for customer interaction.

Some environments support the possibility of using any of the aforementioned types of media either singly or in simultaneous combination. With proper software, two such environments may include the "smart phone" and the personal computer.

The so-called "smart phone" is a portable device that can combine the capabilities of a telephone, VoIP telephone, webcam, SMS terminal, email client, and web browser, with the added benefit of being able to run software applications that can interface and interact with any of these. As far as media interaction is concerned, the smart phone is conceptually very similar to a personal computer.

Each of these media types has its advantages. Voice or teleconferencing offers a low-effort richness of expression (including physical and audible cues of emotional state) and often the most prompt issue resolution. Email, chat and SMS exchanges have the advantages of not requiring a dedicated block of time, and the ability to enter information that may be large or complex to describe (such as an account number, web URI, or other text that may be large or may therefore be easier to copy-and-paste). Many contact handling systems support the use of a single media type for communication from/to a customer.

Language translation by computer ("machine translation") is becoming increasingly capable as a means for communicating between persons who otherwise could not. In addition to text-based communication exchanges, the use of automatic speech recognition and speech synthesis makes it possible to engage in machine-translated conversations between parties.

In these customer communication exchanges, contact handling systems often interact with customers' sensitive information. Federal and state law (e.g., the Sarbanes-Oxley Act), industry standards (e.g., Payment Card Industry Data Security Standards [PCI DSS]), and/or customer expectations may affect the treatment of sensitive information by the contact handling systems.

The inventions disclosed and claimed herein illustrate advantages of using more than one media type during communication as discovered by the inventors thereof, and the further ability to add or transition to different media types during the course of communication in order to use any advantage of any media type, singly, transitionally, or simultaneously, and may include machine translation to further aid in communications or social network connections to facilitate communication.

BRIEF SUMMARY OF THE INVENTION

This Summary is provided to introduce a selection of concepts in a simplified form that are further described below in the Detailed Description, but are not necessarily described in their broadest form. This Summary is not intended to identify key features or essential characteristics of the claimed subject matter, nor is it intended to be used as an aid in determining the scope of the claimed subject matter.

Embodiments disclosed herein relate to methods and systems for improving confidentiality of sensitive information received from a customer in a contact handling system including an agent. The methods and systems can include limiting the ability of the agent to access the sensitive information. In some embodiments, the methods can include opening a first connection path between the customer and the contact handling system. Communication sent by the customer through the first connection path is available to the agent through the agent's workstation; while communication sent by the agent or contact handling system through the first connection path is available to the customer. The agent and customer communicate over the first connection path in a contact. The methods can further include opening a second connection path between the customer and the contact handling system. The customer can send sensitive information through the second connection path to the contact handling system. Communication sent by the customer through the second connection path is not available to the agent.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 8 provides a brief, general description of a suitable computing environment in which several embodiments may be implemented.

DETAILED DESCRIPTION OF THE PREFERRED EMBODIMENTS

Embodiments of the invention relate to methods and systems for improving contacts in a contact handling system. Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The detailed description is divided into ten sections. The organization is included for convenience and is not limiting of the present invention. Embodiments are not limited by their inclusion or exclusion in particular sections. Features from any of the disclosed embodiments may be used in combination with one another, without limitation. The sections are organized as follows:

Section 1 describes examples of components of contact handling systems;

Section 2 describes example usage of contact handling systems;

Section 3 describes examples of serial media transitions in contact handling systems;

Section 4 describes examples of introducing a slower expected communication rate to contacts in contact handling systems;

Section 5 describes examples of parallel media transitions in contact handling systems;

Section 6 describes examples of confidential communications in contact handling systems;

Section 7 describes examples of dissimilar language communication in contact handling systems;

Section 8 describes example components of social media systems;

Section 9 describes examples of using contact information from social media in contact handling systems; and Section 10 describes example architecture.

1. Examples of Components of Contact Handling Systems

Figure 1:
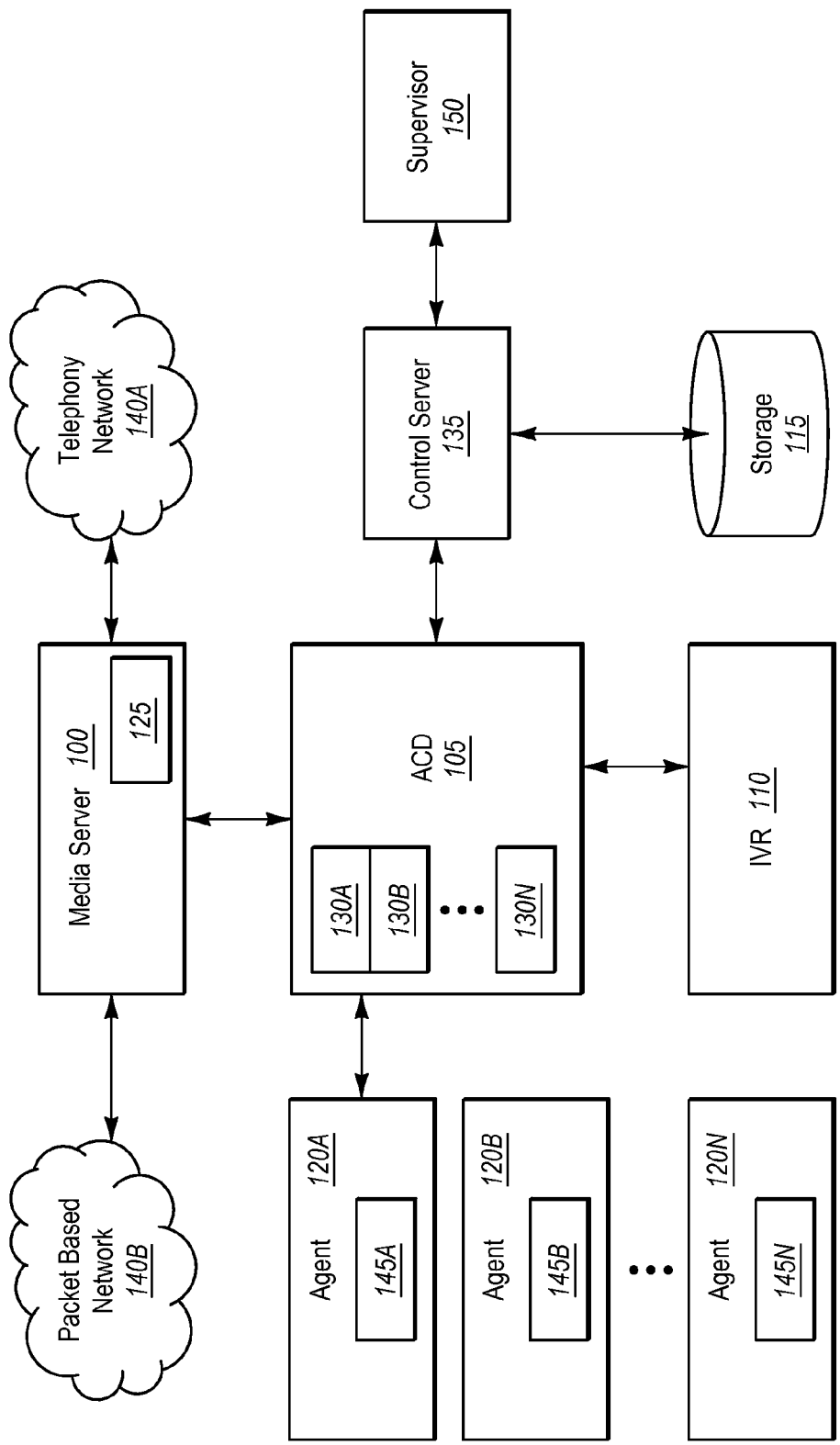
FIG. 1 illustrates an example embodiment of a contact handling system.

FIG. 1 illustrates an example of a contact handling system according to one embodiment of the Applicant's invention.

Components of the contact handling system can include media server(s) 100, an automatic contact (or call) distributor (ACD) 105, an interactive voice response (IVR) unit 110, storage 115, agent workstations 145A-N (collectively referenced as "145"), and customer networks 140A and 140B (collectively "140"), for example.

The media server(s) 100 handle the connection paths for media 125 types such as phone calls, short message service (SMS) messages, multimedia messaging service (MMS), instant messages, fax, conferencing, video conferencing, co-browsing, social media channels, video calling, etc. Media recordings can take place in the media server 100. Media servers 100 can include the traditional telephony PBX (Private Branch eXchange), computer servers handling internet telephony traffic (Voice over Internet Protocol, or VoIP), voice gateways, etc.

The ACD component 105 can track the state of each contact 130 and agent 120A-N (collectively "120"), supplying available agents 120 with waiting contacts 130A-N (collectively "130"). The ACD controls the routing of media to/from agents 120.

IVR units 110 can be used as the first stage of handling an incoming call. The process usually starts by playing pre-recorded audio prompts (e.g. menu selection choices), and accepting handset touch-tone key presses or Automatic Speech Recognition (ASR) to navigate a menu system to supply automated information (such as business address, hours of operation, etc.) or be routed to an agent 120 via the ACD 105.

Storage 115 can include organized computer disk drives as databases and files. Recordings of phone calls, chat sessions and other interactions with customers may be stored on the storage 115 for later reference or review. Many aspects of contact handling system activity can be recorded and stored in the storage 115.

Media server(s) 100, ACD 105, IVR(s) 110 and storage 115 are often referred to as "back office" equipment, referring to restricted-access supervisor 150 and control computers 135 located in server rooms at the contact handling system where these types of equipment are traditionally installed and operated. Functional lines between them are often blurred, meaning that there are various solutions which may combine or distribute the functions of these servers and storage. For example, certain IVR functions can be done in media gateways.

Agent workstations 145 often include traditional desktop computers and phones. Agent workstations can also include more-portable electronics such as laptop computers, netbooks, internet-capable phones or tablets for contact handling system agents to interact with customers and media. Software running on these devices typically includes business applications and programs to interface with the contact handling system, but may extend to programs which can facilitate the inventions disclosed herein.

Network connections to traditional telephony 140A and/or packet-based networks 140B are generally needed to receive contacts 130 and otherwise interconnect the ACD 105 to the other elements of the contact handling system.

The location of media servers 100, ACD 105 and storage 115 can be at the physical location of the contact handling system representing the business. As previously mentioned, more recently, these "on-premises" solutions can be supplemented, or replaced, by "cloud-based" systems, where the media servers 100, ACD 105 and/or storage 115 may be operated far from the traditional contact handling system, and use longer network connections to deliver contact handling system functionality to agents 120, be it at home or at more-traditional contact handling system facilities. In addition, cloud-based solutions can provide a multi-business hosting model, where various businesses are delivered contact handling system functionality via cloud-based equipment which is shared among the businesses, with appropriate safeguards for privacy and data security.

2. Example Usage of Contact Handling Systems

Referring again to FIG. 1, examples of how a contact might begin between a customer and a contact handling system. In an example, the customer can use a traditional "landline" phone to call a company's customer service phone number via a telephony network 140A. The connection paths of the phone can be handled via a media server 100. The customer navigates through a pre-recorded audio menu presented by an IVR 110. The customer inputs responses via touch-tone telephone key presses. The ACD 105 assigns the contact 130A to an agent 120A based on the customer's menu choices and agent availability. Once assigned, the agent 120A may receive the contact at the agent workstation 145A, including information regarding the customer on a screen and the customer's spoken communication relayed to the agent workstation 145A by the media server 110. Spoken communication from the agent 120A is relayed by the media server 100 from the agent workstation 145A to the contact 130. It will be appreciated that the examples of beginning a contact shown are exemplary and there exists other means of beginning or otherwise establishing a contact.

In another example, the customer uses a computer connected to the internet to request an instant message chat with a company's customer service via the company's web site over a packet based network 140B. The customer can chat with the agent 120A via the agent workstation 145A. The agent can communicate with the customer via chat while also communicating with other customers via the agent workstation over chat or other media 125 types.

In some embodiments, a customer may communicate with a contact handling system outside of the contact handling system's normal business hours. In certain example embodiments, the customer uses a computer to navigate to a company's website. The website can show a "Click to Talk" link. When selected, the contact handling system can inform the customer of the contact handling system's regular business hours and ask the customer to provide a future time and date when the contact handling system should initiate communication with the customer.

A customer can enter into a contact with the contact handling system. A contact can include an agent, but an agent is not necessary. A contact can continue as long as some communication remains open between the parties to exchange communication related to a goal of the contact. The contact can end when the customer and contact handling system conclude the communication and close or otherwise abandon their channels of communication.

In certain embodiments, when a customer selects a "Click to Talk" link, the contact handling system causes the customer's browser to render a further menu of options to provide the customer with an option to select a particular function (Sales, Customer Service, etc.) or department, and may even allow a particular phone number or extension to be selected or entered. In some embodiments, the contact handling system may provide the customer with the option of using a "soft phone" at the customer's computer. In yet other embodiments, the system may cause the customer to see an additional browser window containing information deemed by the contact handling system to be useful to the customer. The information may be in the form of a self-help system, a selection of Frequently-Asked Questions (FAQ), advertising of company products, etc. In certain other embodiments, the browser window can also display a form that invites the customer to enter pertinent details (name, account number, order number, problem description, etc.) that can be used to improve the customer's experience. For example, the details can be provided to an agent should the customer ultimately begin a contact with an agent of the contact handling system. In further embodiments, the forms rendered to the customer's browser may be altered by the contact handling system based on business logic.

In some embodiments, the contact handling system or agent can cause a survey to be presented to the customer during or after the contact. In an example embodiment, the contact handling system causes a post-chat survey to appear on the customer's computer or smart phone after a chat-based contact.

3. Examples of Serial Media Transitions in Contact Handling Systems

Serial media transitions can allow a contact occurring over a first media to be transitioned to a second media during the contact. This can permit better flexibility to improve the contact, including responding to changes in customer, agent, or contact handling system circumstances as the contact is ongoing. For example, transitioning to another media can allow a customer to continue with a contact that the customer otherwise would have been forced to end if required to continue using the first media. This may decrease the likelihood that a customer will end a contact prematurely, thus bringing more contacts to a successful completion and increasing customer satisfaction and efficiency of a contact handling system.

A number of scenarios may prompt a transition in media. For example, a customer may have a difficult time understanding an agent over an audio-based media type and switching to a text-based media type may allow the customer to better understand the agent. In another example, the contact may progress to a point where a significant amount of detailed information is needed from the customer; switching from an audio-based media type to a text-based media type may improve the recording of the detailed information and nullify the need for time-consuming spoken data confirmation. In yet another example, a customer may be frustrated by the speed of a text-based media type and transitioning to an audio-based media type may alleviate the customer's frustration. It will be appreciated that the examples shown are exemplary and there exists other scenarios where transitioning between media may be advantageous.

Figure 2A:
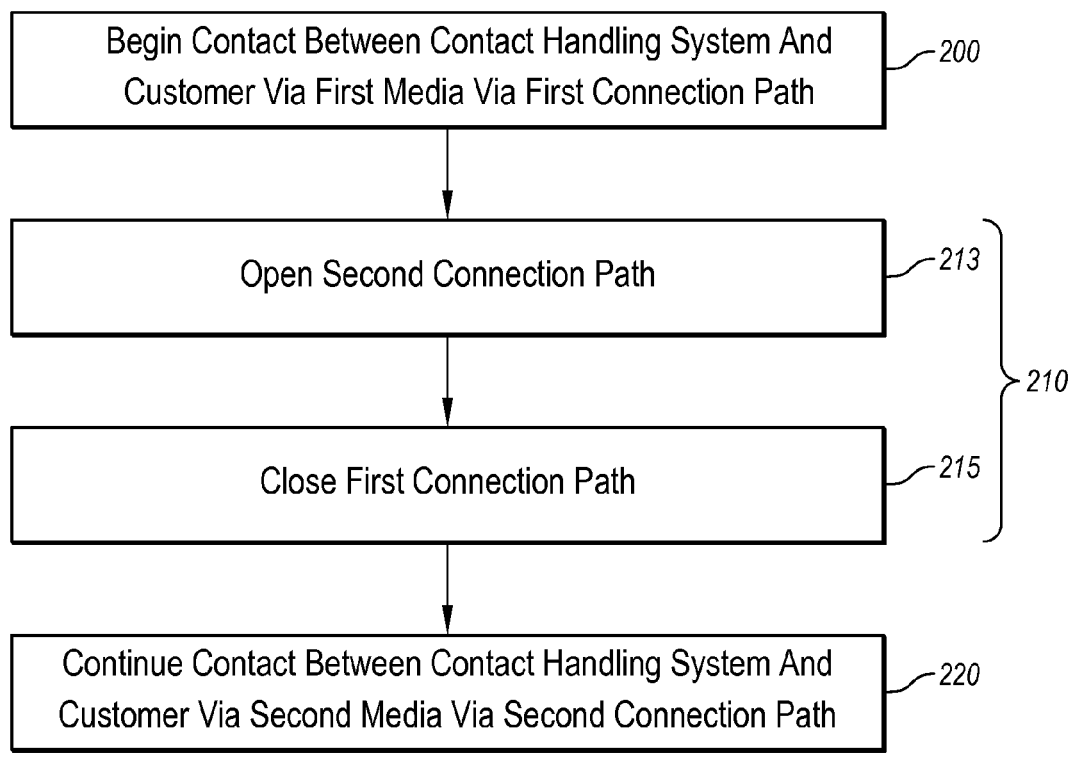
FIG. 2A illustrates a method for serially transitioning between media in a contact.

Referring to FIG. 2A, a method for improving a contact using a serial media transition. The method can occur during a contact between a customer and a contact handling system. During the contact, the customer and contact handling system communicate via a first media 200. In some embodiments, the contact can include an agent, but in some other embodiments, the contact does not include an agent. During the contact, the customer and contact handling system transition to a second media 210. The transition can be accomplished by opening a second connection path 213 and closing the first connection path 215. To transition, the customer and contact handling system stop communicating via the first media and begin communicating via the second media. There can be some overlap in communication over the first and second media. For example, the first media may be communication via a landline based phone call, and the customer and contact handling system may transition to instant message chat over the customer's computer as the second media type. The contact handling system may open a chat window on the customer's computer, send a message and then ask the customer, over the phone, if the customer received the message. The first media connection path can be closed, for example, by "hanging up" the phone. The first and second media can have different, similar, or the same media types. For example, the first media type can be an instant message chat over a laptop and the second media type can be a landline phone call. After the transition, the customer and contact handling system continue the contact via the second media 220. The customer and contact handling system can transition to additional media, including back to earlier used media, without limit.

Figure 2B:
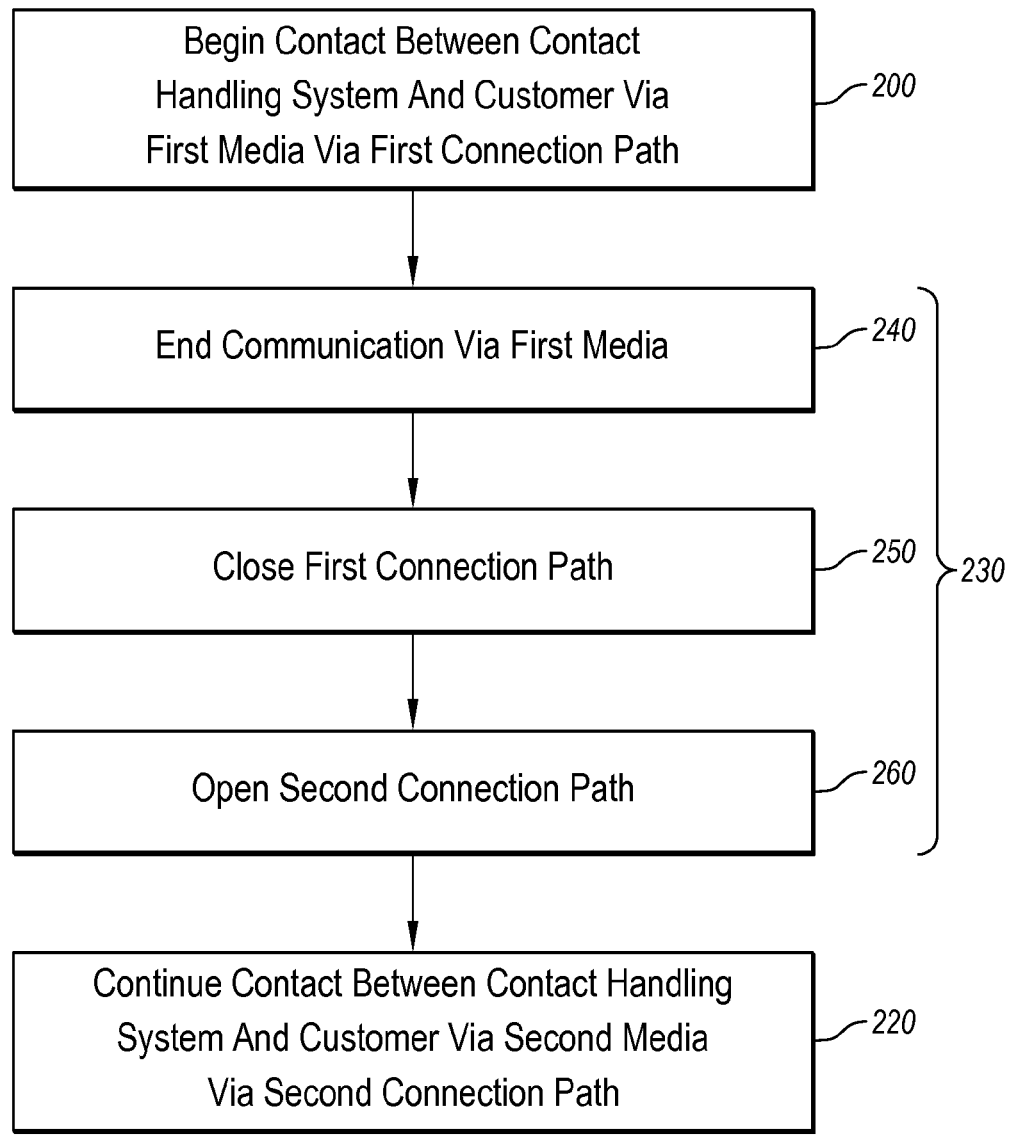
FIG. 2B illustrates another method for serially transitioning between media in a contact.

Referring to FIG. 2B, in some embodiments, the transition from the first media to the second media includes: ending communication between the customer and contact handling system over the first media 140, closing the first connection path over which the first media was communicated 150, and opening a second connection path over which a second media can be communicated 160. These steps can be, but do not necessarily have to be performed in the described order. The first media connection path can be closed before, simultaneously as, or after the second media connection path is opened. Additionally, communication via the first media can be ended before or simultaneously as the first connection path is closed. For example, the second connection path can be opened before the first connection path and communication over the first connection path can be "cut-off" as the first connection path is closed.

In certain embodiments, an agent directs the contact handling system to transition the contact. For example, an agent may select a different media on the agent workstation and select an option to transition to the selected different media. In alternate embodiments, the customer may direct the contact handling system to perform the transition. For example, the customer may be communicating with the agent via chat in a browser window and the chat window may provide links that, once selected, will cause the contact to transition to a different communication media. In further alternate embodiments, the contact handling system may transition the contact automatically. For example, the contact handling system may transition from a videoconference to an audio-only connection if there is not enough bandwidth to continue transmitting video at a threshold quality.

In certain other embodiments, the contact may be transitioned between different media types on the same device. For example, the customer and agent may be communicating via the customer's mobile phone line and the agent might transition the contact to chat, SMS message, videoconference, etc. on the customer's mobile phone at the customer's request.

In some embodiments, the contact can transition from the second media to a third media. The third media type can be the same as the first media type, for example, the contact can transition from a landline phone call to a computer-based instant message chat and back to a landline phone call. The third media type can also be different than the first media type, for example, the contact can transition from a computer-based instant message chat to a mobile phone based SMS message exchange and then transition to a mobile phone call.

Referring again to FIG. 1, an example of how a contact handling system might perform a serial transition in some embodiments. In an example embodiment, an agent 120A may request a transition to a second media at an agent workstation 145A while communicating with a customer over a first media 125 via the telephony network 140A. The agent workstation 145A may perform the transition or may direct another component to perform the transition. In this example embodiment, the agent workstation 145A directs the media server 100 to perform the transition, which may include: opening a second connection path between the agent workstation 145A and the customer via the packet based network 140B, and closing the first connection path. In other embodiments, other components of the contact handling system may perform or direct the transition without prompting from the agent workstation. It will be appreciated that the examples shown are exemplary and a contact handling system may serially transition between media in other ways.

In an example embodiment, a customer uses a smart phone to send an SMS message to a company's customer service department. Shortly thereafter the customer's phone rings and an agent begins speaking with the customer. During the conversation, the customer wishes to stop communicating audibly with the agent because the customer is about to enter a public place and does not want nearby people to hear part of the conversation. The customer requests the agent transition the communication to instant messaging. The customer's instant message information may already be available to the contact handling system, the customer may provide it to the agent, or the contact handling system may obtain the information through other means. The phone call is ended. Shortly thereafter, the agent sends the customer an instant message and the contact continues with the customer receiving and sending instant messages via his smart phone.

In a further example embodiment, a customer uses a browser to navigate to a company's website. The web site shows a "Click to Talk" link. When selected, the customer is asked to enter the phone number that the company should call in order to speak with the customer. Shortly thereafter the customer's phone rings and the customer begins speaking with an agent. The agent uses a headset as part of the agent workstation to speak to the customer. During the conversation the agent offers to videoconference. The customer agrees and the agent requests a transition to videoconference at the agent workstation. In requesting the transition, the agent provides the customer with a URI and a password that allows the customer to videoconference with the agent over the internet via the customer's desktop computer. The customer enters the URI in his browser and enters the password, at which point both the customer's webcam and microphone are transmitting video and audio to the agent workstation. The agent's headset continues to be used for the audio, but the agent workstation's webcam is now transmitting video of the agent to the customer. Once the videoconference connection is made, the contact handling system or the customer "hangs up" the phone connection and the customer and agent continue the contact via videoconference. After a time, the customer wishes to transition to video calling on the customer's mobile phone, because the customer wishes to move to another location away from the desktop computer. The customer gives the agent the customer's contact information for video calling. The agent enters the information into the agent workstation, the video calling starts, and the videoconference via the desktop computer is ended.

In another example embodiment, a customer uses a computer browser to navigate to a company's website. The website shows a "Live Chat" link. When selected, a chat session is requested. As with many chat requests, an agent is not immediately available. While no agent is available, the contact handling system communicates with the customer, inviting or causing the customer to see an additional browser window. In some embodiments, the browser window contains information deemed by the contact handling system to be useful to the customer. The information may be in the form of a self-help system, a selection of Frequently-Asked Questions (FAQ), advertising of company products, etc. In other embodiments, the additional browser window may display a form that invites the customer to enter pertinent details (name, account number, order number, problem description, etc.) that will be provided to the agent assigned to the customer for the chat session. When an agent is assigned to the chat session, the contact transitions to a chat with the agent and customer and the agent can save time by using those pertinent details already filled in by the customer.

In an additional example embodiment, a customer is in a chat session with an agent, but is becoming impatient and frustrated with communicating over chat. The customer requests live conversation or videoconference either by stating it in the chat text, or selecting the options from the chat client. The chat session soon transitions to one of the following, as requested by the customer: customer microphone audio conversation to the agent, telephony conversation between the customer and the agent, or videoconferencing between the customer and the agent.

In yet another example embodiment, an agent is assigned a contact at an agent workstation by an automatic contact distributor. The client media is a mobile phone call. The client wishes to move the contact to her land-line phone—perhaps over concerns for her monthly allowance of minutes or her phone's remaining battery charge—and asks the agent if it would be possible. The agent pulls up information about the client on the agent workstation. The client's landline phone number is in the system, but only the last four digits are available to the agent to protect the client's privacy. The agent confirms with the client that the agent should call the landline phone number, which the agent identifies with only the last four digits available to the agent. Once confirmed, the agent uses the agent workstation to transfer the contact to the stored landline number.

In still another example embodiment, a customer uses a browser to navigate to a company's website. The web site shows a "Click to Talk" link. The customer selects the link inside of the contact handling system's normal business hours. When selected, the customer is asked to enter the phone number that the company should call in order to speak with the customer. Shortly thereafter the customer's phone rings and the customer begins speaking with an agent.

In yet a further example embodiment, a customer broadcasts a question to a company publicly via social media. The contact handling system receives the question and the contact is assigned to an agent, who responds with a public reply to the customer. The customer, wishing to continue the contact via phone, sends a private message back to the company via the same social media and includes the customer's phone number and a request for a phone call. The agent calls the customer and continues the contact over the phone.

4. Examples of Introducing a Slower Expected Communication Rate to Contacts in Contact Handling Systems A contact occurring over a particular medium generally has an expected minimum communication rate, i.e., the parties to the contact have a general expectation of how much time may pass before a next communication is received. The expected minimum communication rate may be dependent in part on the nature, content, or context of the communication. For example, a customer may expect a longer wait if he knows the agent is looking up information or is otherwise occupied with an auxiliary task. However, the expectation of a minimum communication rate will vary widely based on the media of the contact. When transitioning a contact to a media with a slower expected minimum communication rate, parties to the contact do not expect the same pace of communication as they did before the transition. Instead, the parties generally expect more time to pass between communications. However, faster communication rates are usually acceptable. In some embodiments, a party may not communicate at all while the contact occurs over a media with a slower expected communication rate. Transitioning a contact to a media having a slower expected communication rate can permit better flexibility to improve the outcome, including responding to changes in customer, agent, or contact handling system circumstances as the contact is ongoing. For example, transitioning a contact from a current media to a media having a slower expected communication rate can allow a customer to continue with a contact whereas the customer otherwise would have been forced to end if required to continue the contact at the current pace. This may decrease the likelihood that a customer will end a contact prematurely, thus bringing more contacts to a successful completion and resulting in an increase in customer satisfaction and efficiency of contact handling systems.

In some embodiments, a transition to a media with a slower expected communication rate can result in a period of transacting little or no communication. For example, in response to a break in communication via a first media, the contact handling system can send the customer another communication via a different media, the other communication including a URI for reconnecting via the first media. The different media can be monitored for a response, but a response is not necessarily expected. The customer may use the URI to reconnect via the first media without responding via the different media. In certain embodiments, the customer can resume the contact with the same agent the customer was communicating with previously. In other embodiments, particularly where the agent is no longer available, the customer is connected with a different agent who is given the details of the contact so the customer can continue the contact with the different agent. There are numerous circumstances that can cause a customer to break from communication with little or no warning. For example, a power outage or dead battery may cause the customer equipment or network connection to stop functioning. In other examples, a customer may have to deal with a problem that develops outside of the contact.

In other embodiments, the customer can continue communicating via a different media type having a slower expected communication rate, which may have the effect of allowing the customer to slow down the pace of a contact. There are a number of reasons a customer may wish to slow down the pace of a contact. For example, during a contact, a customer may need to attend to an event external to the contact, but the current pace of the contact requires too much of the customer's attention for the customer to successfully attend to the event; however, if the pace of the contact were slowed, the customer could successfully attend to the event and resume the contact when circumstances allow. In other examples, a customer may need to attend to an event external to the contact, but it would be considered discourteous to attend to the event while providing the contact with the type of media or degree of attention required by the current pace of the contact.

In some embodiments, after transitioning to a media having a slower expected communication rate, the contact may conclude over the media having the slower expected communication rate. In some other embodiments, after transitioning to a media having a slower expected communication rate, the contact can transition again, but to a media having a faster expected communication rate. This can have an effect of speeding up the progress of the contact because the parties are expected to respond more quickly and/or the media may permit faster communication (e.g., a majority of people can talk faster than they can type). In transitioning again, but to a media with a faster expected communication rate, the contact can transition to a third media or back to the original media.

Figure 3A:
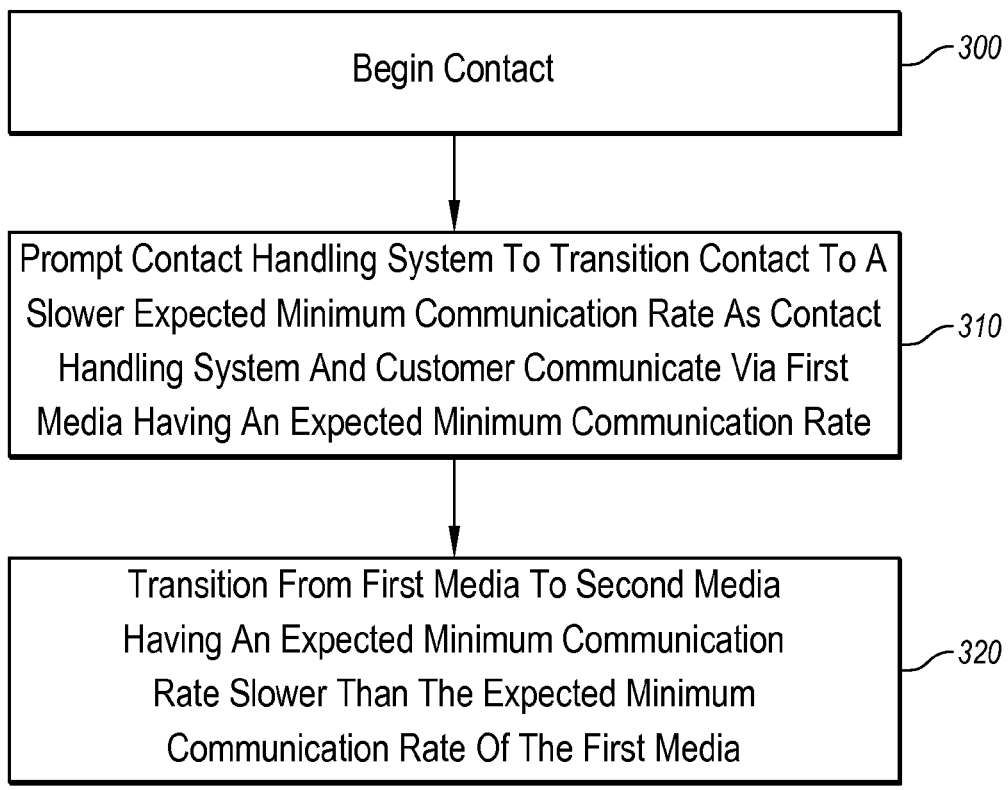
FIG. 3A illustrates a method for introducing a slower expected communication rate in a contact.

Referring to FIG. 3A, a method for introducing a slower expected communication rate to a contact with a customer. The method can occur during a contact 300. The customer can be, but does not have to be, communicating with an agent. At a point in the contact, the contact handling system is prompted to introduce a slower expected minimum communication rate 310. The contact handling system can be prompted to introduce a slower expected communication rate in a number of ways. In some embodiments, the customer prompts the contact handling system. For example, the customer can prompt the contact handling system by selecting an option through key presses on a phone keypad or selecting a button or link on an instant message chat window and/or browser window. In other embodiments, the contact handling system monitors the contact and prompts itself. For example, the contact handling system may be prompted to introduce a slower expected communication rate when one or more of the current communication media connection paths are disconnected. The customer can be informed in advance that disconnecting the current media will prompt a transition to a media with a slower expected communication rate, allowing the customer to initiate the slower expected communication rate by disconnecting the media intentionally or unintentionally. In still other embodiments, an agent can prompt the contact handling system to introduce a slower expected communication rate. For example, the agent can select an option on an agent workstation.

At the time the contact handling system is prompted, the customer and the contact handling system are communicating via a first media type having an expected communication rate. Different media types potentially have different expected communication rates. For example, when communicating via phone, VoIP, or videoconference, parties to a communication expect that generally less than a minute will pass between someone speaking over those media types unless one or more of the parties is placed on hold or otherwise indicates that latency in response should be expected. Parties to a communication may expect that more time may pass between communications being transmitted via other media types. For example, parties to an instant message chat may expect as long as several minutes or more to pass before a response message is received, particularly if a waiting party knows the responding party is chatting via a mobile phone. Parties communicating via an SMS media type may expect as long as several hours or more to pass before a response message is received. Parties to an email exchange may expect as long as several days to pass before receiving a response; parties may even expect that no response may be received at all. It will be appreciated that communication rates can be faster—even much faster—than the expected communication rates. Media types with expected communication rates generally slower than communication rates expected over phone—for example, instant message chat, SMS, email, etc.—can potentially reach communication rates near or above phone communication rates depending on the communication, and the parties' attention, input (e.g. typing) speed, and communication tools (e.g., prepared blocks of text to be automatically sent to the customer). It will also be appreciated that other media types not discussed here may have other expected communication rates. In addition, it will be appreciated that expected communication rates may change over time or time of day for a given media type.

Referring still to FIG. 3A, once prompted, the contact handling system transitions from the first media type to a second media type having an expected communication rate slower than the first media type 320. In some embodiments, the slower expected communication rate allows one or more party to the contact to take more time to respond to a particular communication while the party waiting for the response expects that the responding party may take more time to respond. In some other embodiments, a party to the communication may not respond at all via the second media type, particularly where the contact handling system sends a URI allowing the customer to reestablish communication via the first media type.

Figure 3B:
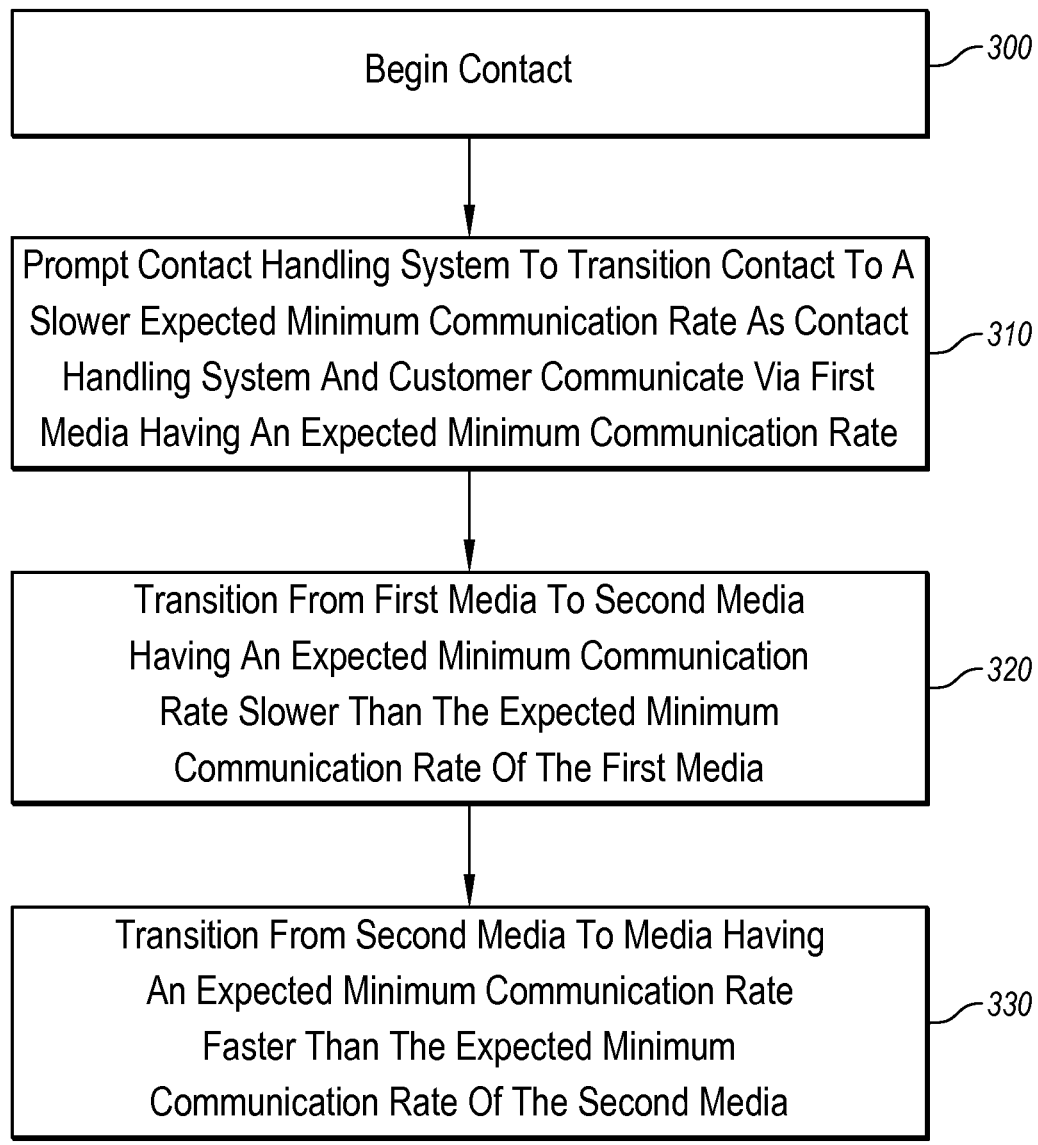
FIG. 3B illustrates a method for introducing a transitory period of a slower expected communication rate in a contact.

Referring to FIG. 3B, the contact may transition to a media type having an expected communication rate faster than that of the second media type 330. In some embodiments, the contact may transition back to the first media type. In some other embodiments, the contact may transition to a third media type. Communication rates of different media can relate to the length of time it would take to perform the same contact over different media. It will be appreciated that communication rates for a given media may relate to expected communication rates for that media. For example, communication via phone may occur faster than via chat, which may occur faster than via SMS, which may occur faster than via email. It will be appreciated that exceptions can exist depending on the circumstances of the communication. By transitioning to a second media type having a faster expected communication rate, the progress rate of the contact can increase, prompting the contact to conclude more quickly than if the contact continued via the second media type.

In an example embodiment, a customer is speaking on a mobile phone with an agent of a company regarding an issue, but the customer now needs to attend a business meeting. The agent transitions to SMS communications while the meeting is in progress, but the issue is still unresolved. After the meeting the customer and agent transition back to voice telephony.

In another example embodiment, a customer is speaking on a mobile phone with an agent of a company while in a line in a retail store to buy a number of products from a retail clerk from an unrelated company. Foreseeing a need to interact with the retail clerk and recognizing that the retail clerk and other people in line may consider the customer's continued use of the mobile phone to be rude, the customer requests that the agent transition the contact to SMS. The agent selects a corresponding option on the agent workstation, which disconnects the phone connection path, brings up SMS communication software on the agent workstation, and opens a SMS communication path using the customer's mobile phone number, which is stored with the rest of the customer's information. The customer continues to communicate with the agent via SMS on the mobile phone during times when the retail clerk does not require the customer's attention. After the customer has finished interacting with the retail clerk, the contact is reverted back to voice over the customer's mobile phone.

In an additional example embodiment, a customer is chatting with an agent via instant messaging using the customer's laptop computer. The customer's child requires medical attention as a result of an unexpected accident before the customer and agent can resolve the contact. The customer informs the agent of his intention to stop chatting with the agent. The agent sends the customer an email including a link in the body of the email that the customer can use to resume the chat session with the agent. Later the customer does not respond to the email with another email, but instead opens the email using the customer's smartphone and selects the link, which opens a chat window with the agent on the customer's smartphone. The agent and the customer continue the contact while the customer's child receives medical attention. When the contact is concluded, the agent causes a survey to open in a browser window on the customer's phone. In a similar embodiment, the customer selects the link in the email on the customer's laptop computer after the child has received the medical attention.

It will be appreciated that a contact may achieve a slower expected communication rate by transitioning to a given media type in some example embodiments, while transitioning from the same given media type in other example embodiments. For example, one contact can begin via instant message chat and transition to electronic mail to achieve a slower expected communication rate, while another contact can begin via telephone and transition to instant message chat to achieve a slower expected communication rate.

It will be appreciated that the customer, agent, or contact handling system may desire increased latency. In some example embodiments, latency can be added to increase the number of customers communicating with an agent, particularly during short-term peaks in contact volume. This can be done by increasing the number of customers in concurrent contact with an agent, e.g., through two or more instant messaging or SMS windows on the agent workstation. The agent may be able to juggle communicating with multiple customers over some media more successfully than others. For example, an agent can compose and send a text communication to one contact while waiting for a response from another contact. Customers expect the communication rate to be slower with some media, and as a result, may be more patient in waiting for a response when communicating via these particular media. As a result, the agent may have more opportunity to communicate with other customers.

In an example embodiment, the contact handling system notes a high peak volume of customers waiting to begin a contact with an agent. The contact handling system indicates the high volume of waiting customers through agent workstations. An agent speaking with a customer over the phone who sees the indication asks the customer if the contact can be transitioned to instant message chat. The customer agrees, and the contact transitions from phone to instant message chat. Once chatting with the customer, the ACD and media server of the contact handling system supply the agent with additional contacts, which the agent is able to handle concurrently.

In another example embodiment, the contact handling system notes a high peak volume of contacts waiting to speak to a human agent by phone. The IVR of the contact handling system plays a pre-recorded audio prompt informing the waiting customers that they may be able to communicate with an agent sooner if they are willing to transition to chat, SMS, or email. Customers willing to transition to the other media indicate their acceptance and choice by touch-tone key presses or Automatic Speech Recognition (ASR). The contact handling system transitions the willing customers to their chosen media and supplies the transitioned contacts to available agents.

5. Examples of Parallel Media Transitions in Contact Handling Systems

Parallel media transitions can allow a customer in a contact to communicate with the contact handling system over more than one media connection path in parallel. This can permit better flexibility to improve the contact, including permitting particular communication to be sent via media better suited to communicate the particular information. For example, as the contact is conducted via a first media, information that can be more efficiently communicated via a different media can be communicated in parallel over the media, thus improving the overall efficiency of that contact. As a result, customer satisfaction and the efficiency of the contact handling system may be improved.

Figure 4A:
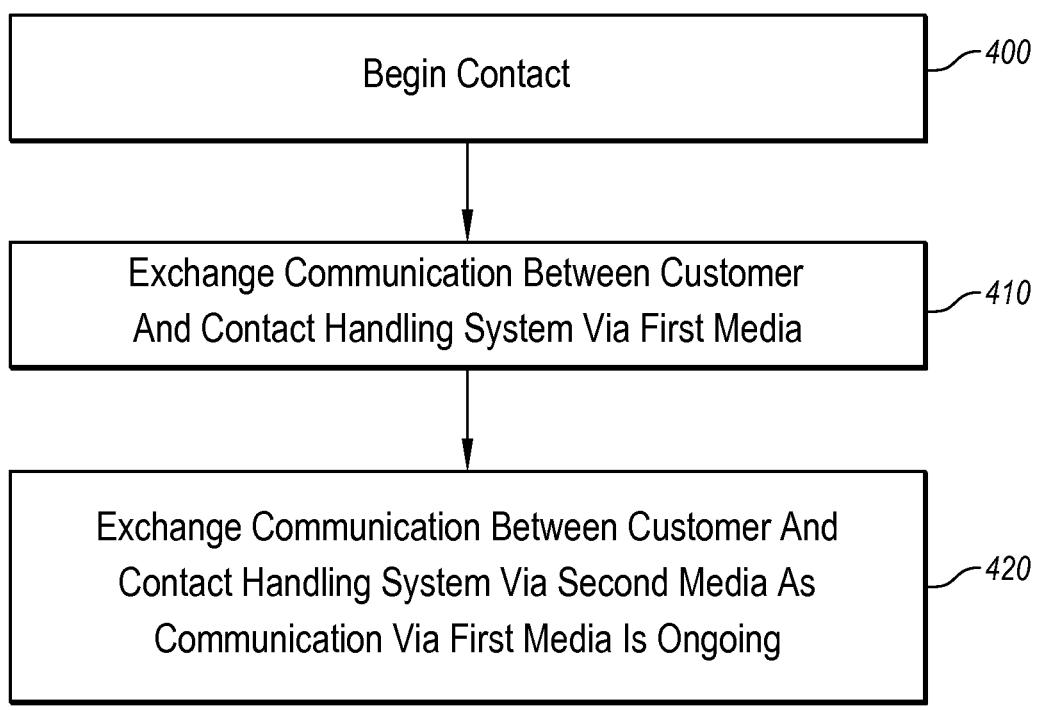
FIG. 4A illustrates a method for communicating over two media in parallel in a contact.
Figure 4B:
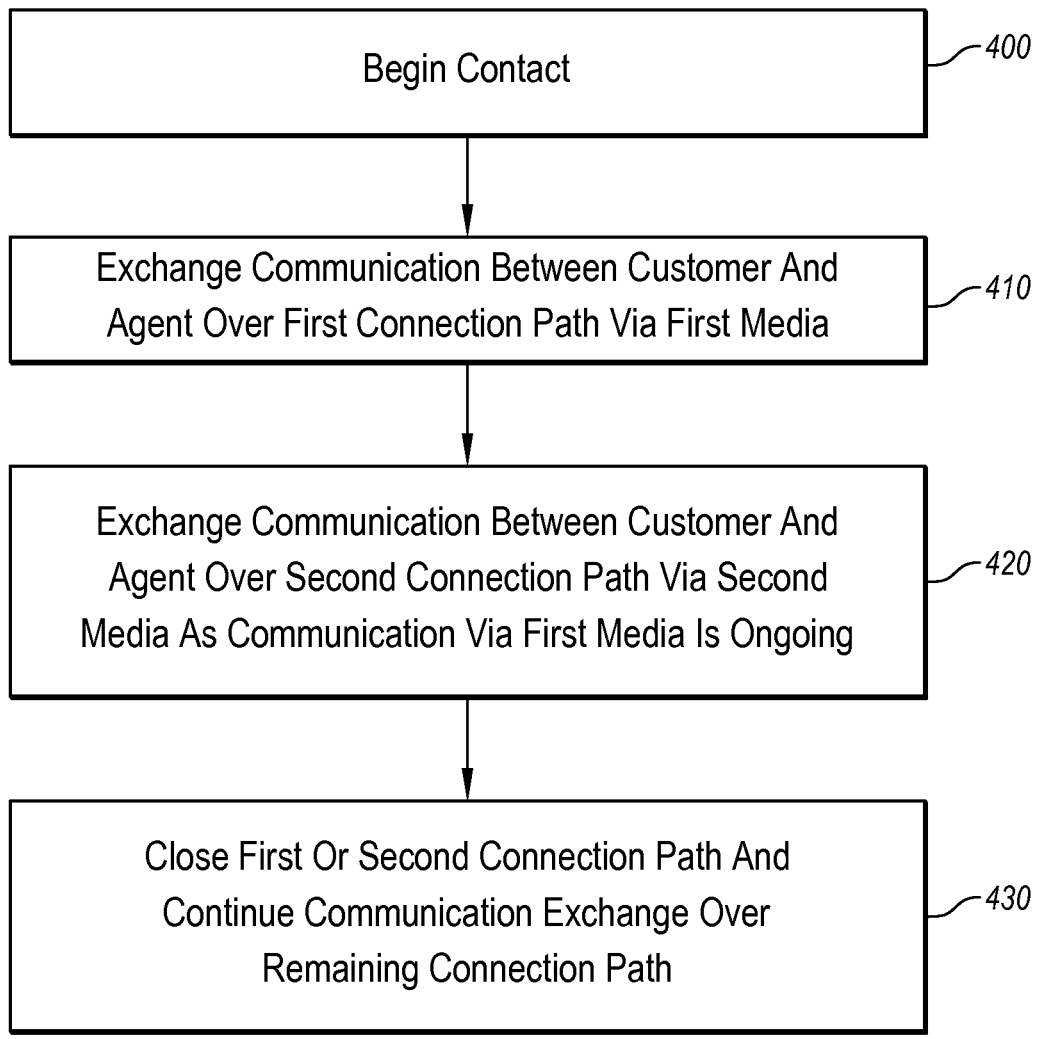
FIG. 4B illustrates a method for communicating over media in parallel including closing a connection path in a contact.
Figure 4C:
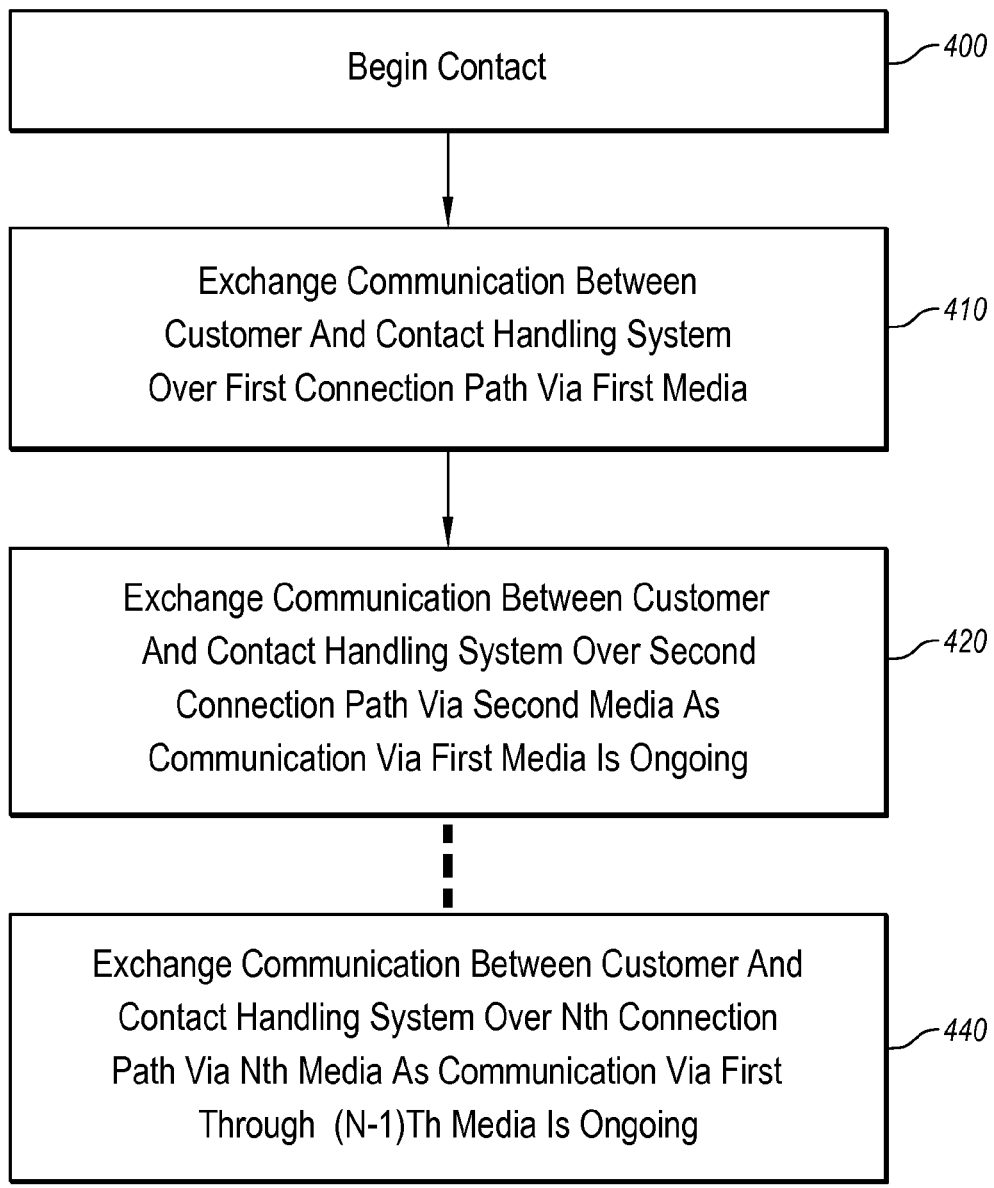
FIG. 4C illustrates a method for communicating over more than two media in parallel in a contact.

Referring to FIG. 4A, a method for improving a contact using parallel media transitions. The method can occur during a contact between a customer and the contact handling system 400. The contact can, but does not have to include an agent. During the contact, the contact handling system and customer communicate via a first media 410. This can include the customer waiting in a queue for an available agent. Also during the contact, the customer and contact handling system communicate over a second media as the customer and contact handling system continue to communicate via the first media 420. The decision to communicate over a parallel communication can be made for a number of reasons. Information to be communicated to the agent or customer may be difficult to transcribe or memorize. For example, a party to the contact may need to provide a long product code made up of seemingly random letters and numbers to the other party. While the code may take a relatively long time to recite to the other party over the phone and be prone to transcription errors, the code may be sent more quickly over a text-based or image-based media. Parallel communication can also be used to visibly demonstrate instructions or descriptions that would take longer to convey over text- or speech-based media. For example, an agent providing customer support for a product may open a parallel communication path to show the customer images of the product to provide context for the written or spoken support and to allow the agent to draw attention to parts of the product using visual reference. Parallel communication can also allow parties to a contact to demonstrate internet-based actions in a shared setting. For example, an agent may walk a customer through an account setup process on an internet website, allowing the customer to select options, but allowing the agent to navigate at least part of the time (co-browsing). Parallel communication can additionally allow a contact handling system to increase customer satisfaction during the contact by allowing more flexibility to respond to a customer's needs. For example, if the customer is having a difficult time understanding or following an agent's spoken instructions for a task, the agent may send the customer (potentially previously prepared) text and/or image-based instructions while continuing to communicate verbally to ensure the customer is better able to understand the text and/or image-based instructions and to continue to provide additional support. Referring to FIG. 4B, in some embodiments, the first or second media connection path can be closed after a period of parallel communication 430. It can be advantageous to close connection paths when they are no longer being used, are no longer needed and/or are using system resources that can be better utilized by the contact handling system. Referring to FIG. 4C, more than two communications can be sent in parallel 440.

Parallel communication can include simultaneous communication over two or more media, i.e., a first communication is sent via a first media as a second communication is sent via a second media. However, parallel communication can also include sending a second communication over a second media while the first media connection path is open and monitored by the parties even if no communication is sent via the first media connection path simultaneously as the second communication is sent. For example, a customer and agent can be on the phone with one another while the agent sends the customer an SMS message in a parallel communication even if neither the agent nor the customer speaks as the SMS message is transmitted.

In certain embodiments, the customer initiates the parallel communication. For example, by selecting an option to add an additional media connection path on a chat window. In some embodiments, the customer can send the contact handling system a communication via an additional connection path and the contact handling system will create the parallel communication automatically. For example, a customer may be in a contact with an agent when the customer sends the contact handling system an SMS message from the customer's mobile phone without specifically routing the SMS message to the agent in some way. The contact handling system can receive the message, check the originating number against a database of customer information to determine that the SMS message originated from a customer currently in a contact with an agent. The contact handling system can route the SMS message to the particular agent's agent workstation and send any response SMS messages to the customer's mobile phone. In other embodiments, the agent initiates the parallel contact. For example, the agent may select a different media on the agent workstation and select an option to send a communication via the different media. In other embodiments, the contact handling system may initiate the parallel communication independent of the agent. For example, the contact handling system may automatically send the contact a parallel communication in response to a particular occurrence in the contact.

In some embodiments, the parallel communication can occur via a second media received by the same device as the first media. For example, the customer may receive an SMS message on the same mobile phone being used to speak with an agent. In other embodiments, the parallel communication may be received on a different device than the first media. For example, the agent and customer may begin a parallel co-browsing session using the customer's desktop computer while the agent and customer speak on the phone.

In some embodiments, the parallel communication can include co-browsing. Co-browsing can include the system, agent, or customer causing a browser window to be seen by both the customer and the agent, where the actions of either party are reflected in both windows. The agent may then assist the customer with navigation or other actions within the browser window.

In some other embodiments, the parallel communication includes allowing the customer to see and potentially interact with software and/or multimedia communication coordinated by the contact handling system. This may include web conferencing, real-time collaboration, desktop sharing, or the like. It will be appreciated that these communication types can be browser-based and/or require browser plug-ins or stand-alone software.

In an example embodiment, a customer of a company uses a computer browser to navigate to the company's web site. The web site shows a "Live Chat" link. When selected, a chat session is launched with an agent of the company. During the chat, the agent causes the customer to see an additional browser window with information deemed by the system (e.g. the script controlling the contact) or the agent to be potentially useful to the customer.

In another example embodiment, a customer uses a computer browser to navigate to a company's web site. The web site shows a "Click to Talk" link. When selected, the customer is asked to enter the phone number that the company should call in order to speak with the customer. Shortly thereafter the phone rings and the customer begins speaking with an agent of the company. During the conversation, the agent causes the customer to see an additional browser window with information deemed by the system or the agent to be useful to the customer. The phone number entered by the customer is saved as a browser "cookie" that may be retrieved during future communication and displayed as a convenience to the customer in case it might save her/him the necessity of re-entering the number.

In a further example embodiment, a customer uses a computer browser to navigate to a company's web site. The web site shows a "Click to Talk" link. When selected, the customer is asked to enter the phone number that the company should call in order to speak with the customer. Shortly thereafter the phone rings and the customer begins speaking with an agent of the company. During the conversation, the agent offers face-to-face conversation, at which time their webcams are linked and begin the exchange of video. The audio continues to be exchanged via telephony.

In an additional example embodiment, a customer of a company uses a computer browser to navigate to the company's web site. The web site shows a "Live Chat" link. When selected, a chat session is requested. As with many chat requests, an agent is not immediately available. Until an agent becomes available and after the chat session begins, the system causes the customer to see an additional browser window with information deemed by the system to be useful in resolving the customer issue. Such information may be in the form of a self-help system, a selection of Frequently-Asked Questions (FAQ), advertising of company products, etc. The additional browser window can display a form that invites the customer to enter pertinent details (name, account number, order number, problem description, etc.) that will be provided to the agent assigned to the customer for the chat session. This allows the agent to save time by using those pertinent details already filled in by the customer.

In yet another example embodiment, a customer is speaking on a mobile phone with an agent. The information requested by the customer may be error-prone to transcribe or memorize, so the agent sends the information to the customer via SMS or email while the conversation continues via voice.

In yet a further example embodiment, a customer is conversing via the telephone with an agent. During the conversation, the customer and/or agent identify a benefit that would result from establishing a connection between their computers (e.g., a chat window, a browser window, or the like). Still on the phone, the customer navigates to the company's web site and clicks on "Join Agent". If the customer has previously used "Join Agent" or "Click to Talk" on this computer, the customer was prompted to enter their phone number, which was kept in a browser cookie. If not, the customer is prompted to do so now. Using the customer's phone number, the contact handling system determines which agent is party to the communication, a new window appears on the screen of both the agent and the caller, and the data connection is made. As a result, the customer and agent can communicate over the phone and the computer connection. In another example embodiment, the customer navigates to the company's customer service website while in a queue waiting to be assigned to an available agent. The customer may be encouraged to do so by a prerecorded message played as the customer waits for an agent to become available. On the website, the customer can choose to associate the computer connection with the existing phone connection through a cookie or other identifying information. Once the phone and computer connections are associated the contact handling system, including an agent, can communicate with the customer via both connections. For example, the customer can be prompted to enter pertinent information via the computer connection to be delivered to the agent ultimately assigned the contact.

In yet an additional example embodiment, a customer calls a software company's customer service department via the telephone to seek customer support for a particular software program sold by the company. While providing product support over the phone, the agent offers to demonstrate the instructions while describing the instructions over the phone. The customer agrees and uses a browser on a computer to navigate to a website as instructed by the agent. The agent runs the program from a contact handling system server and the program window appears on the agent workstation and the customer's computer display. The agent interacts with the program while delivering instructions over the phone; the customer sees the agent's interaction with the program while hearing the agent's instructions over the phone. The customer has a question about the program and interacts with the program while explaining the question over the phone; the agent sees the customer's interaction with the program while hearing the customer's question over the phone.

In still a further example embodiment, a customer navigates to the website of a company offering web-based products and services. The customer selects a "Live Chat" link on the web site. A chat window opens and the customer begins to chat with an agent about purchasing the company's products and services. During the chat, the agent causes a browser window to appear on the customer's display to provide a visual representation of the differences in product and service packages offered by the company including an interactive demonstration that the customer can control via the customer's input devices. The customer purchases one of the packages. The agent then opens another browser window and walks the customer through the purchase and setup steps in the browser window while explaining his actions and answering customer questions via the chat window. The customer enters information and the agent submits the information and navigates through the steps. When a license agreement is displayed, the agent scrolls through the agreement and highlights sections of the agreement as the agent explains various provisions in the license. Once the agent has finished explaining the license, the customer checks a box acknowledging that the agent has gone over the license and selects an "I Agree" link to accept and enter the license agreement. Once the purchase is complete, the agent shows the customer how to use the product by logging the customer into the customer's actual product. The agent gives the customer a tour of the features—describing the feature via chat or through another open parallel media such as phone and demonstrating the product in the co-browsing window—including options to change the product's preferences. While being shown these options, the customer changes some of the options from the customer's device.

6. Examples of Confidential Communications in Contact Handling Systems

Confidential communications allow a customer to provide sensitive information to a contact handling system without providing the sensitive information to an agent communicating with the customer in a contact. This can improve the secure handling of the sensitive information—particularly where a human agent is involved. Thus a contact handling system or a related company may better comply with federal and/or state laws (e.g., the Sarbanes-Oxley Act), industry standards (e.g., Payment Card Industry Data Security Standards [PCI DSS]), and/or customer expectations regarding privacy and sensitive information.

Figure 5A:
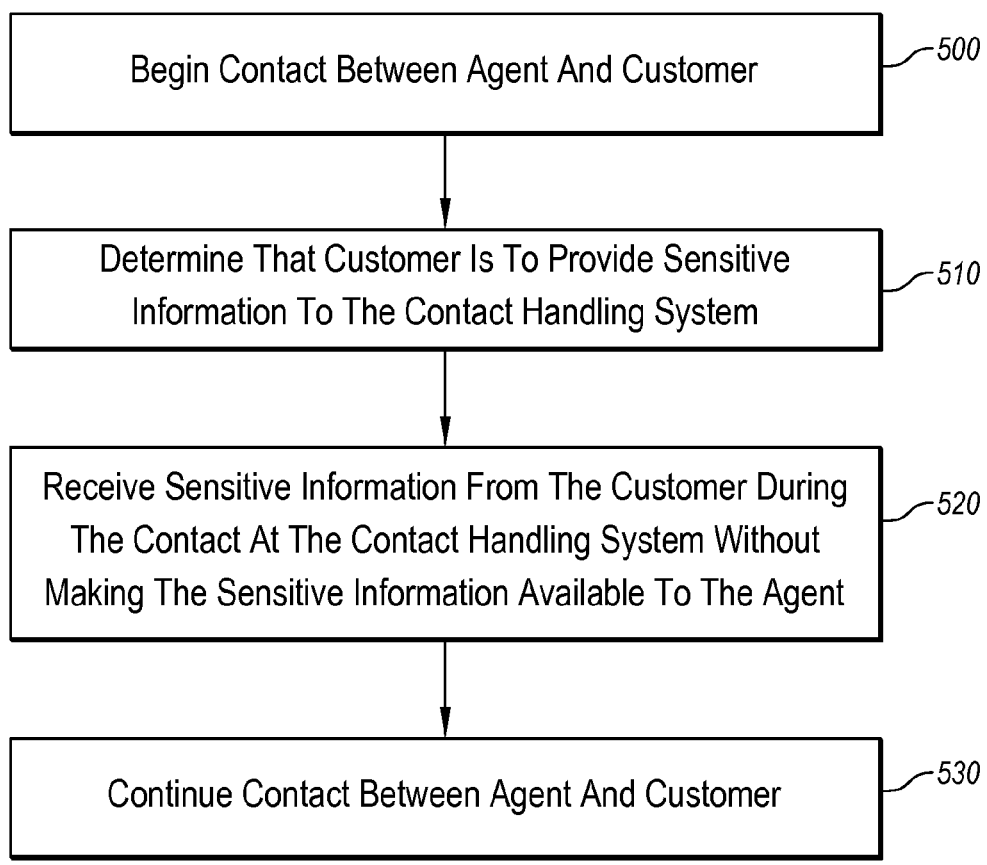
FIG. 5A illustrates a method for receiving sensitive information at a contact handling system in a contact.

Referring to FIG. 5A, a method for receiving sensitive information from a customer while a media channel is open between a customer and an agent. The method can occur during a contact between a customer and an agent 500. During the contact, it is determined that sensitive information is likely to be provided by the customer to the contact handling system 510. Sensitive information can include any information a customer or contact handling system considers sensitive. Sensitive information can include, but is not limited to, information classified as sensitive or confidential by law, industry standards, or community standards. Some types of information can be considered sensitive by one customer and not by another customer. For example, a particular customer may consider his home address to be sensitive information while another customer does not consider her home address to be sensitive information. In some embodiments, the agent determines that the customer is to provide sensitive information to the contact handling system. In other embodiments, the customer informs the contact handling system of intent to provide sensitive information to the contact handling system. In still other embodiments, the contact handling system autonomously monitors the communication exchanged between the customer and agent and determines the customer is to provide sensitive information.

During the contact, the customer sends sensitive information, the contact handling system receives the sensitive information, and the sensitive information is not provided to the agent 520. Once received, the contact handling system can, for example, use, validate and/or store the sensitive information. In some embodiments, the agent may ask for the sensitive information and request the customer provide the sensitive information to the contact handling system in a way that prevents the agent from receiving the sensitive information. In certain embodiments, by sending the sensitive information by another media not available to the agent. For example, the agent can provide the customer with a phone number, secure URI, etc. that the customer can use to provide the sensitive information.

In some embodiments, the determination that the customer is likely to provide sensitive information 510 occurs when the customer provides sensitive information 520; in some embodiments, the contact handling system can monitor communication between the customer and the agent for potential sensitive information. Should the contact handling system recognize possible sensitive information—e.g., the customer attempts to send the agent a number resembling a credit or debit card number—the contact handling system can use, validate and/or store the sensitive information and redact the sensitive information in a way that the agent does not receive the sensitive information.

The customer and agent continue the contact after or while the sensitive information is received 530. In some embodiments, the agent or contact handling system confirms receipt of the sensitive information. In other embodiments, the confirmation includes an identifying portion of the sensitive information; for example, if the sensitive information is a number—such as a social security number or credit card number—a subset of the digits may be used as an identifying portion.

Figure 5B:
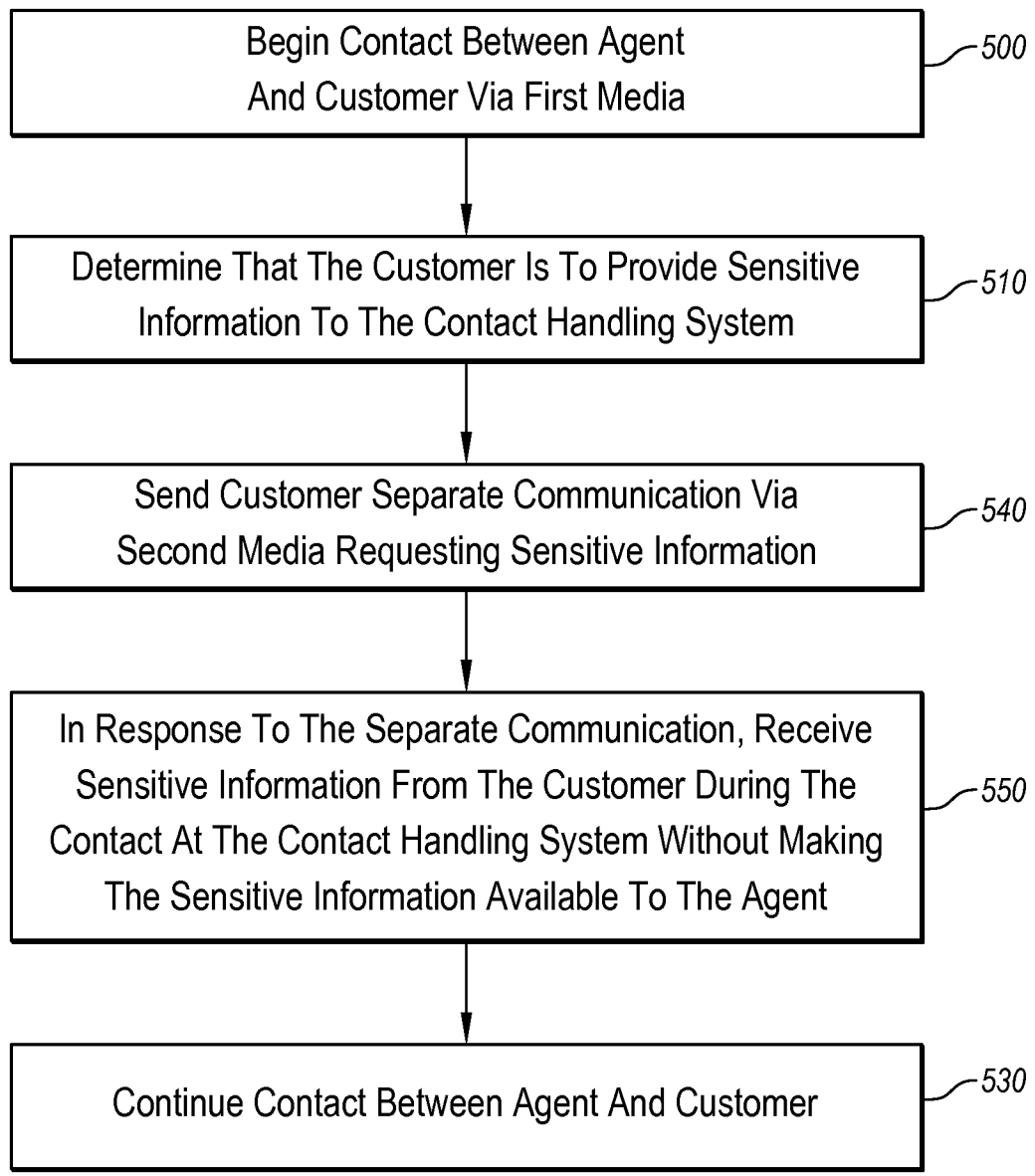
FIG. 5B illustrates a method for receiving sensitive information at a contact handling system in response to a communication sent to the customer in a contact.

Referring to FIG. 5B, in some embodiments, the contact handling system can send the customer a separate communication 540. In some embodiments, the agent can cause the separate communication to be sent to the customer. In other embodiments, the contact handling system can monitor the customer/agent communication and send the separate communication independently (e.g., when the customer/agent communication indicates that the customer intends to provide sensitive information). In yet other embodiments, the customer can cause the separate communication to be sent. The separate communication media can be the same as or different than the media employed in the customer/agent communication. In some embodiments, the separate communication is integrated into the communication media sent by the agent; for example, if the agent and customer are chatting via instant message, the separate communication may be a private message ("PM") that appears in the customer's chat window. The customer replies to the separate communication to submit the sensitive information 550.

In an example embodiment, a customer uses a browser to navigate to a company's website. The web site shows a "Click to Talk" link. When selected, the customer is asked to enter the phone number that the company should call in order to speak with the customer. Shortly thereafter the customer's phone rings and the customer begins speaking with an agent. During the conversation, the agent's software system needs to know confidential information, such as a social security number, bank account number, credit or debit card information, account numbers, passwords, pin numbers, etc. that cannot be disclosed by the customer to the agent for whatever reason. The system causes the customer to see an additional browser window with a form that will submit the confidential information to the system without disclosing it to the agent. In some embodiments, the agent can walk the customer through the steps to fill out the form; however, the agent cannot see the information the customer enters. In certain example embodiments, the agent co-browses with the customer and the fields containing sensitive information are blacked out, distorted, or otherwise redacted on the agent's workstation. In certain other example embodiments, the agent is provided with a sample of the browser window provided to the customer and the agent can provide assistance to the customer through chat, including images of the browser window in the chat session.

In another example embodiment, an agent is assigned a contact by an automatic contact distributor. The media is a landline phone call. The customer on the phone is seeking technical support for a product the customer purchased. The agent provides technical support for the company that manufactured the product. In their conversation, the agent and customer determine that the warranty period has expired for the product. The customer agrees to pay for a technical support session with the agent. The agent clicks a button on the agent's workstation and a media server in the contact handling system calls the customer's landline phone number. The customer receives the call via "call-waiting." The customer switches to the call; in the meantime, the agent waits on the other line. The customer is prompted to enter her credit card information by an automated message, which the customer does using the phone's touch-tone keypad. The credit card information is transmitted back to the contact handling system, which the contact handling system stores. After the customer has entered her credit card information, she switches back to the waiting agent. The agent's workstation indicates that the customer has provided valid payment information, but the agent cannot see—and cannot access—the customer's credit card information. The agent then provides the customer with technical support.

In yet another example embodiment, a client is speaking on a mobile phone with an agent concerning changes to be made to an account the customer holds with the agent's company. The agent navigates to a window on the agent workstation that allows the agent to make changes to the client's account. The contact handling system checks if the phone number of the phone the client has used to call the contact handling system has been registered with the system. It has not, and the contact handling system sends the client an SMS message requesting the client's social security number for identity validation. In the meantime, the contact handling system disables the agent's ability to change the client account setting from the agent workstation and displays a message to the agent indicating that the system is validating the client's identity. The client replies to the SMS message with another SMS message containing her social security number; this message is not disclosed to the agent. After the system has verified the client's social security number, the agent is able to make changes to the client's account at the agent's workstation. The agent then makes changes to the client's account according to the client's instructions.

In an additional example embodiment, a collection agency calls a customer with an outstanding debt via a telephone landline to attempt to collect on a debt. In speaking to an agent, the customer agrees to pay the owed debt through installment payments. The customer provides the agent with an email address over the phone and the agent emails the customer a link. The customer, while still on the phone with the agent, uses his computer, tablet or smartphone to open the email and follow the link to a website where the customer can provide his bank account information for the installment payments. The agent walks the customer through the steps to submit the bank account information. Once submitted, the agent receives a confirmation that the bank account information was received, including the last four digits of the bank account number to identify the bank account without providing the agent with the full account number. The agent informs the customer that the account information was received, reciting back the last four digits of the bank account number. The customer then arranges payment details such as timing and amounts with the agent. In a similar example embodiment, instead of sending a link via email the agent recites a URI over the phone that the customer can enter into a web browser to navigate to the website to provide his bank account information.

In another example embodiment, a customer is chatting with an agent via instant message chat over the internet. In the course of the chat, the agent asks for the customer's address. However, the customer does not want to provide her address to the agent and instead selects an option on the chat window that allows her to provide information directly to the system without providing it to the agent. After the customer selects the option, an additional chat is started between the customer and an automated chat system in a separate chat window or within the chat window the client is using to chat with the agent. The automated program may check the status of the agent's workstation to deduce what information the customer has chosen not to provide to the agent; otherwise, the automated program communicates with the customer to determine what information the customer would like to provide. While the human agent is still available, the automated chat program requests the customer's address and the customer provides her address in the automated chat. Once the customer's address is provided, the agent's workstation indicates that the customer's address has been entered, but the actual address is not shown. The human agent and customer continue their communication.

In an example embodiment, an agent and customer are communicating via SMS messages. The customer includes a credit card number and expiration date in an SMS message intended for the agent. The contact handling system recognizes the credit card number and expiration date in the message. The contact handling system stores the credit card information and redacts the SMS message at the agent workstation so the agent cannot read the credit card information.

In an additional example embodiment, a customer is at a company's physical customer service department, speaking with an agent. In the course of the communication, the contact handling system needs the customer's social security number kin the course of the transaction. The system sends the customer's mobile phone an SMS message as the customer is speaking with the agent. The customer responds to the SMS message with a message including the customer's social security number.

In still another example embodiment, a customer of a company uses a computer browser to navigate to the company's web site. The web site shows a "Live Chat" link. When selected, a chat session is launched with an agent of the company. During the chat, the agent opens a co-browsing session with the customer, using the agent workstation browser to demonstrate to the customer how to use the company's web-based product. When the company's web-based product requires the customer's password, the customer enters the password into the password field, but the password is not revealed to the agent because the password is masked, i.e., the password characters are not displayed as the customer types them, but are instead replaced with bullet characters.

In some embodiments, the customer is not communicating with a human agent, but still provides sensitive information via a separate media channel because the separate media channel is more secure, is perceived (perhaps incorrectly) by the customer to be more secure, or is more convenient for entering the information. In an example embodiment, the customer is chatting via instant messaging with the contact handling system via an automated chat program. The chat program asks the customer to provide her debit card number. The customer asks for a more secure method of submitting her debit card number and the contact handling system opens a secure webpage in response.

In another example embodiment, the methods are employed in survey scenarios. Surveys are performed to gather information on a variety of subjects. In some instances, survey results may be skewed because the person being surveyed is embarrassed or otherwise unwilling to answer a question truthfully to an agent. These surveys may be performed without an agent—e.g., through prerecorded questions and touch-tone responses over a phone or written questions over the internet. However, it may be advantageous to have an agent communicate with the client; for example, to convince the client to take the survey or to answer any questions the client might have. To improve survey results by allowing the person surveyed to give anonymous answers, the agent may ask the client questions as the client responds to those questions via a browser window, SMS, or other media.

7. Examples of Dissimilar Language Communication in Contact Handling Systems

Dissimilar language communication can allow a contact handling system to better manage contact backlog, particularly for customers requesting language support for languages a majority—or all—agents are not proficient in. Better management of contact backlog can allow some waiting customers to communicate with an agent sooner than the customer would otherwise. This may improve customer satisfaction by shortening wait times or by allowing a customer to communicate with an agent when doing so would otherwise not be possible. Dissimilar language communication can also allow a contact handling system to better manage agent availability, scheduling, and workforce makeup; language support of particular languages can be handled through dissimilar language communication and it becomes less important for agents possessing particular language skills to be available and/or on staff.

Figure 6:
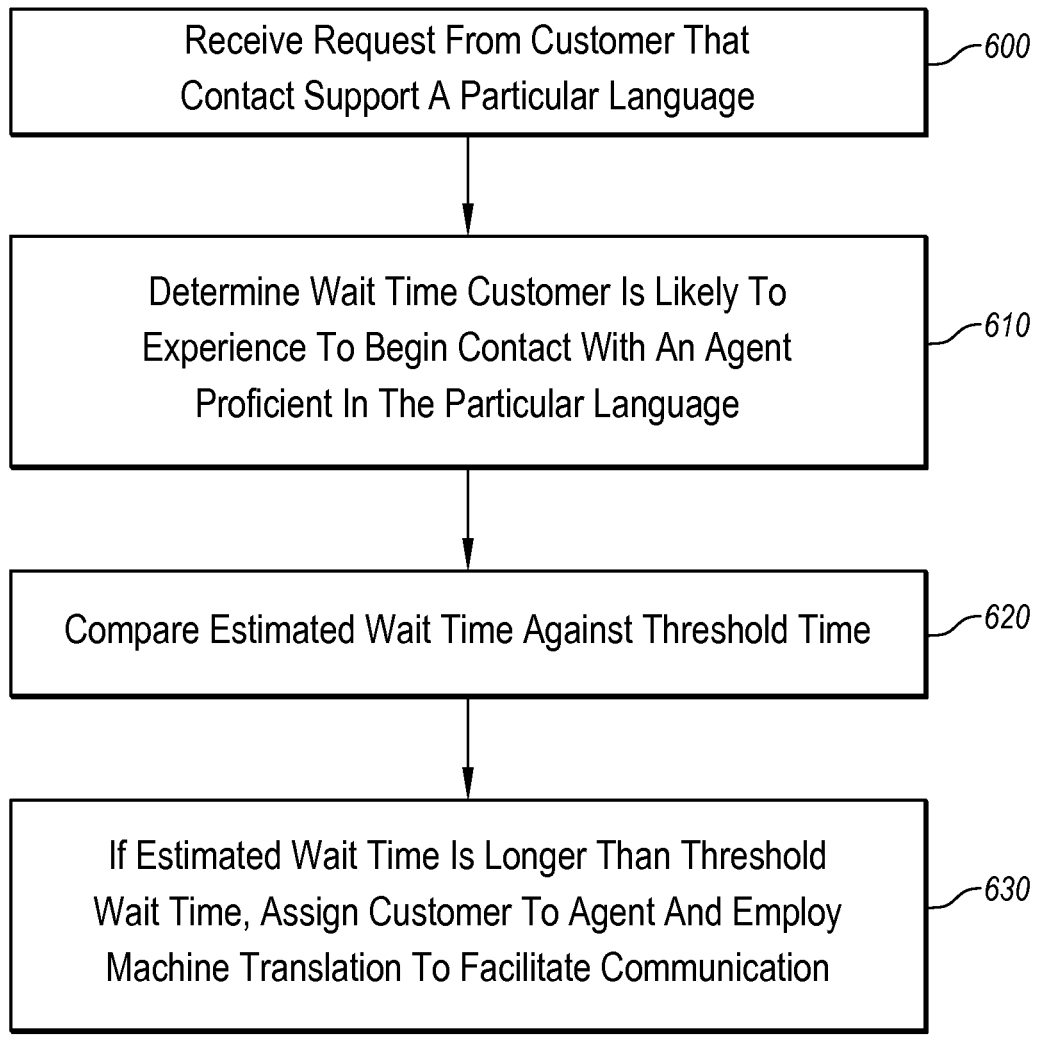
FIG. 6 illustrates a method for facilitating communication using machine translation in a contact handling system.

Referring to FIG. 6, a method for facilitating a contact using dissimilar language communication. In some embodiments, a customer can request that a contact support a particular language that the customer is proficient using 600. In certain embodiments, the customer can request the language explicitly. For example, the customer calls a contact handling system and an IVR offers language choices. The customer then selects a language choice. In certain other embodiments, the language choice is made indirectly. For example, the customer may request a contact via a browser window, sending with the request the browser's default language setting. In another example, the customer calls the contact handling system and the contact handling system defaults the IVR language to the majority language of the country from which the call originated. If the customer does not choose to change the IVR language, the majority language of the country from which the call originated is treated as the requested language.

The contact handling system can then determine the wait time the customer likely will experience before communicating with an agent proficient in the requested language 610. In some embodiments, to determine the likely wait time, the contact handling system employs a general wait time calculation taking into consideration only agents proficient in the requested language and other customers that have requested the same language rather than all agents and all customers. In some embodiments, agents proficient in the preferred language may be queried via agent workstations for an estimated time to availability. It will be appreciated that other methods and systems for calculating wait time estimates are available.

The system can then compare the likely wait time against a threshold wait time 620. In some embodiments, the threshold wait time may be a fixed. In certain embodiments, the threshold time period is set to a time period considered to be a reasonable time period for a customer to wait for an agent proficient in the requested language. In certain other embodiments, the threshold time period can be relative. For example, the threshold can fluctuate based on other customers' wait times. The threshold can also depend on the requested language and/or the location the call originated from. For example, the threshold can vary based on cultural expectations common in the country where the call originated. In another example, the threshold can vary based on the effectiveness of machine translation between the requested language and the language or languages available agents are proficient using; if machine translation is particularly efficient for the requested language, threshold time period may be shorter than for languages less efficiently handled by machine translation. Machine translation may be more effective in translating a first language to a second language over a third language. For example, the first and second language may share grammatical or other similarities allowing the machine translation to translate between the two languages more effectively than the first and third languages. Some languages may be translated more effectively using machine translation because more effort has gone into creating effective machine translation. For example, machine translation between English and Spanish—both with hundreds of millions of native speakers—may be more effective than machine translation between languages having only a few million native speakers.

If an agent proficient in the preferred language is not available within the threshold wait time, the system may assign the customer to an available agent not proficient in the preferred language and employ machine translation to allow the agent and customer to communicate 630. In several embodiments, the contact handling system can request the customer's consent to use machine translation. In some embodiments, the customer is queried for preferences regarding machine translation. For example, the contact handling system may inform the customer of the estimated time to communicate with an agent proficient in the preferred language and give the customer the option of: communicating with an available agent through machine translation; selecting an additional preferred language; waiting for an agent proficient in the preferred language; or receiving a callback, email, or other communication when an agent proficient in the preferred language becomes available. In some embodiments, the contact handling system may assign the contact to an agent proficient in a language that will allow more efficient machine translation to and/or from the requested language.

In some embodiments, the contact handling system can take a wait-and-see approach. For example, once the contact handling system determines that an agent proficient in the requested language is unlikely to become available within the threshold time, the contact can then be placed in a general pool of contacts waiting for the next available agent. The general pool of customers may be customers requesting a contact in the language primarily used by the contact handling system. While the customer is waiting for the next available agent to communicate with using machine translation, the customer may be assigned to an agent proficient in the requested language if such an agent becomes available while the customer is waiting. In another example, the contact handling system may arrange to assign the customer to the next available agent proficient in the preferred language, but should no such agent become available during some time period, the system may then check to see if an agent proficient in the preferred language is likely to be available within a threshold time.

In some other embodiments, the customer's chosen communication media type does not support machine translation and the system may offer to the customer media types that will support machine translation. The contact handling system may transition the contact to a chosen media type that supports machine translation. In other embodiments, the contact handling system may not support machine translation for the customer's preferred language and the contact handling system may offer the customer other language choices that the customer may be proficient in that the contact handling system can support via machine translation.

In some embodiments, the agent can be informed when an agent proficient in the chosen language becomes or is about to become available. The agent and/or customer can then decide if the contact should be transitioned to the agent proficient in the requested language or to continue with the current agent using machine translation.

In an example embodiment, a customer calls the customer support department of a company. The IVR offers language choices. If for any reason the language selected cannot be supported within a threshold time period by call center agents, machine translation will be used to communicate between caller and agent.

In another example embodiment, a customer uses a computer browser to navigate to a company's web site. The web site shows a "Live Chat" link. When selected, a language specifier is offered. If for any reason the language selected cannot be supported within a threshold time period by call center agents, machine translation will be used to communicate between caller and agent.

In some embodiments, the method can be used in contacts originated by the contact handling system. In an example embodiment, an agent contacts a customer via phone. The agent is proficient in English; the customer knows very little English, but is proficient in German. The customer speaks to the agent in German. The agent does not recognize the language and selects an option on the agent workstation indicating such. The contact handling system, using a recording of the conversation, runs commercially available language recognition on the customer's speech and recognizes it as German. Potentially, if the contact handling system has the capability to translate spoken German to English, the system does so and displays the translation on the agent workstation. The agent inputs the text of a message to the customer into the agent workstation and the contact handling system uses machine translation and commercially available speech synthesis to communicate the message to the customer in German over the phone. The agent then requests that the contact handling system assign an agent proficient in German to speak to the customer if such an agent is available. The ACD searches for available agents proficient in German and determines that none are available or likely to be available shortly. The contact handling system then informs the agent that the customer will remain with the agent. The contact continues—translating the agent's English communication into German for the customer and translating the customer's German communication into English for the agent. If the contact handling system does not have the capability to translate spoken German to English, the contact handling system plays a prerecorded German message. The prerecorded message may give the purpose for the call and indicate that if the customer is interested, the customer may stay on the line for an agent proficient in German, can switch to a text-based media able to support machine translation, or can request a call back when an agent proficient in German is available.

8. Example Components of Social Media Systems

Social media systems generally allow users of social media to connect and interact with other users of social media. Examples of social media systems include Facebook, Twitter, and LinkedIn; however, many more social media systems exist. A user of social media can generally include people, companies, and other entities. Many social media systems allow users to form an identifiable connection with other users. Examples of the names given in some social media systems to forming these connections include "friending," "following," "connecting," "liking," etc. However, it will be appreciated that other names may be used for the connection formed between users of social media. Some social media systems allow one-way connections, i.e., a first user can form a connection with a second user without the second user forming a connection with the first user. Some social media systems require at least some of the connections to be two-way connections, i.e., in order for a first user to form a connection to a second user, the second user must form a connection to the first user. The nature of the connections can alter the interactions and information exchanged between the two users.

Many social media systems include profiles identified with each user. These profiles can contain information on the user with whom the profile is associated. Information available via a profile may include contact information such as phone numbers, instant messaging identifiers, etc. Some of a user's information may be made available to other users, often through a location providing biographical information, for example, a "profile page." A user often can control privacy settings that can allow other users to access the contact information contained in the profile and/or at the biographical location. For example, a user can often make information in the user's profile public and thus available to anyone or anything with access to the social media—even nonusers of the social media. A user can often limit accessibility of some of the information on the user's profile to other users of the social network or to a subset of users. A user can, for example, often prohibit others with whom the user is not connected from accessing the user's detailed information. Thus, a user can identify contact information for another user if the other user's settings allow the contact information to be accessed. In some instances the users have to be connected for one or both of the users to access the information of the other user. Some social media systems allow a user to use the social media systems' user identification to identify the user to websites and internet applications not on the social network. For example, a website may allow a user to login to the website using a social media network login even when the website and social media network are unrelated.

Many social media systems allow users of the social media to communicate with other users from within the social media. Many social media systems also allow users of the social media allow users of the social media to communicate using mobile phones via the social media. In some social media systems, communication channels may include media types equivalent to email, instant messaging, VoIP, videoconferencing, video calling, SMS, and other media types. Social media systems may include communication means unique to social media. For example, many social media systems allow users to post communication to another user in an area of the social media associated with another user. Social media settings can make these posts public or available to only a subset of users. Many social media systems also allow users to broadcast communication to connected users or the public. Often, users can communicate by making comments on posts and broadcasts available to the users. Some social media systems allow a user to reference other users in posts, broadcasts, and comments. Such referencing often notifies the referenced user of the communication. Some social media systems may have unique or semi-unique media types. For example, the social media system Twitter can allow users to "Tweet" a message 140 characters or less to the public or to one or more other users privately. Referring to FIG. 1, the media 125 types discussed in the embodiments disclosed herein may include media types available through social media channels.

It will be appreciated that the examples of components and features of social media and social media systems described herein are exemplary and there exist other components and features of social media and social media systems. It will also be appreciated that the components and features described do not necessarily exist in every system that can be considered a social media system for purposes of the embodiments described herein.

9. Examples of Using Contact Information from Social Networks in Contact Handling Systems Facilitating a contact using contact information from social media allows a contact to occur with less input from a customer. This improves the likelihood that the contact will occur. In sales contexts, the customer is able to prompt a contact more impulsively and has little opportunity to abort the contact before being contacted by the company. In support and customer service contexts, the customer can prompt a contact with fewer steps and limited hassle. In addition, the added convenience of prompting a contact in some embodiments may prompt social media users to form social media connections with some companies, thus increasing the number of connections the company has within a social media system. Social media connections can often be used to perform marketing campaigns, improve company goodwill, and improve company image.

Figure 7:
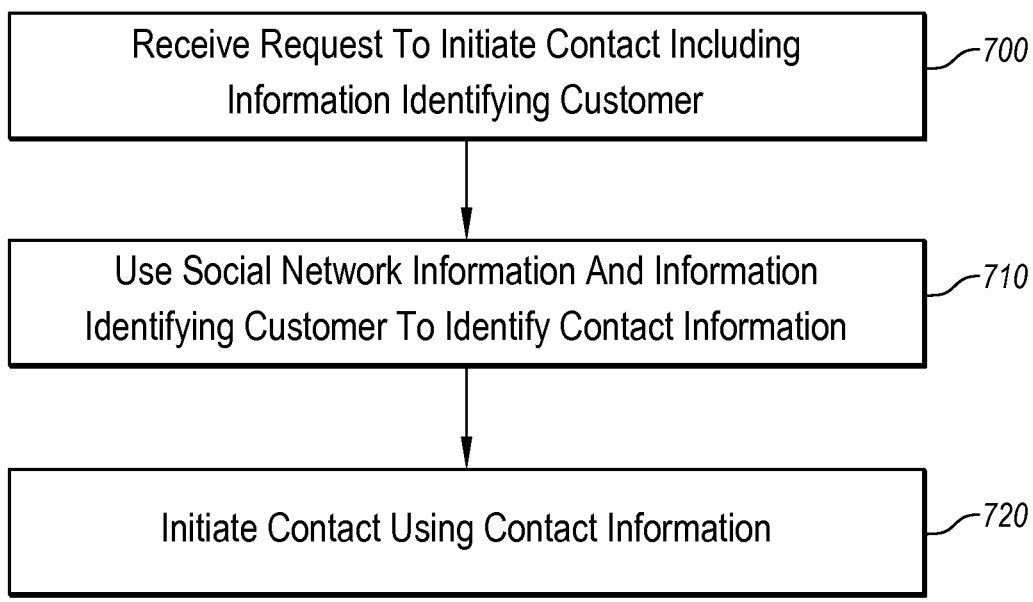
FIG. 7 illustrates a method for using social media to facilitate a contact.

Referring to FIG. 7, a method for facilitating a contact using contact information from social networks is illustrated. The contact handling system can receive a request to initiate a contact 700. In certain embodiments, the request can be received by the contact handling system through the internet. It will be appreciated that the request can be received by the contact handling system through other media types. In several embodiments, the request includes information identifying the customer's identity on one or more social media systems. In some embodiments, the request includes a social media system identifier for the customer, i.e., a unique identifier assigned to the customer by the social media system to identify the customer within the social media system. In certain embodiments, the customer's social media identity is provided when the customer uses a social media system login to log into another system from which the contact is requested. In some other embodiments, other information is provided that allows the contact handling system to determine a customer's social media identity, for example, the identifying information may include the customer's name, email address, and/or contact information for media types that the customer is not requesting the company use to initiate a contact.

Using the identifying information, the contact handling system finds the customer's contact information using social media information 710. A social network allows users of the social network to connect and interact with other users of the social network. Many social networks include accounts identified with each user. These accounts can contain information about the user with whom the account is associated. Information available via an account may include contact information such as phone numbers, instant messaging identifiers, etc. Some social media networks may provide this information through a profile page associated with the user. A user often can control privacy settings that can allow other users or the public to access the contact information contained in the account. Some users of social media networks may allow their contact information to be publically available through social media. Some users of a social media network may only allow other users of the social media network to access their contact information. Other users may only allow other users with whom the user has formed a connection to access their contact information. Still other users may completely prevent contact information from being provided or may only allow access to a select subset of connected users. To access the information, the contact handling system can query the social network directly for the information in some embodiments. For some social networks, users' information can be accessed by a URI containing the users' social media identifiers. For some social networks, a search feature is provided. A search feature can be particularly useful if the social network identifier is not known. In some other embodiments, the contact handling system can query a database containing information collected from social networks. The database can be created as the users of social media systems form connections with the company and/or from information publicly available on social media systems. The information in the database can be updated by monitoring the social media systems. Information can also be included from non-social media sources, including the contact handling system and/or the company's interactions with customers; the internet; or from other directories. Multiple social media accounts can be linked to a single user, thus making information from multiple social media accounts available. The found contact information is used to initiate a contact 720.

In some embodiments, a communication request can originate from a mobile phone application including a feature allowing a customer who has downloaded and installed the application to the customer's mobile phone to request the company initiate communication with the customer. The mobile phone application may provide a "Call Me" button that, when selected, transmits a communication request to the contact handling system. In some further embodiments, a mobile phone application can provide a further menu of options to select a particular function (Sales, Customer Service, etc.) or department, and may even allow a particular phone number or extension to be selected or entered. The mobile phone application can transmit the phone number for the mobile phone with the communication request if the phone's settings allow it. However, when the customer makes a communication request via a different media, the mobile phone's settings do not allow the application to transmit the customer's phone number, or the feature is disabled to encourage customers to form connections with the company using social media, the contact handling system can use the customer's social media information to attempt to locate the customer's contact information.

In some embodiments, the company arranges for advertisements to appear to users of a social network as the users utilize the social network. The advertisement may communicate to the user that if the user clicks the advertisement, the company will attempt to initiate communication with the user. If the advertisement is clicked, the contact handling system may receive a request to initiate communication along with the clicking user's social media identifier. The contact handling system can then use the social media identifier to attempt to locate the user's contact information.

In an example embodiment, a customer has a Facebook or other social media account in which her name and phone number are entered. Company ACME Corp. is also on Facebook, and the customer has formed a connection with ("friended") ACME on Facebook, allowing ACME access to her personal information. Using an ACME application on her mobile phone, the customer requests a call from ACME customer support just by pressing a "Call Me" button on the ACME mobile phone application.

In another example embodiment, a customer uses a social network login to log in to the company's website. In this example embodiment, the customer navigates to the company's website, where there is a button prompting the customer to log in using the customer's social media login. The customer logs in to the company's website, and once logged in, the customer selects a "Call Me" link. The contact handling system requests the customer's phone number from the social network. The customer's social network settings allow the contact handling system to receive the customer's phone number from the customer's social media profile. The customer may be required to provide permission for the phone number to be sent to the contact handling system through a prompt presented to the customer.

In an example embodiment, a customer selects an advertisement that the customer understands will prompt the company to call the customer. The customer's selection of the advertisement sends the contact handling system a call request along with the customer's social media network identification. The contact handling system checks to see if the customer has formed a connection with the company on the social media network. The customer has, and the contact handling system initiates communication with the user to begin the contact using the customer's contact information provided on the customer's social media profile page.

In another example embodiment, the contact handling system includes an application on a social media network available to users of the social media network. In this example embodiment, a customer adds the application to the customer's social media account. When the application is used, the customer is given an option to request that the company call the customer. The customer is given the option of specifying a company department that the customer wants to initiate communication with the customer. The customer selects the company's service department and selects "Call Me." The application retrieves the customer's phone numbers from the customer's account information. The customer's account contains more than one phone number and the application allows the customer to select which number the customer wants the contact handling system to call. The application then submits the request and the contact handling system calls the customer shortly.

In an additional example embodiment, a customer has formed a connection with a company on a social network. The customer's name, email address, phone number and IM identifier are provided in the customer profile. The customer navigates to the company's website and clicks a "Call Me" link on the company's website. The company's website previously transferred a "cookie" to the customer's computer during an earlier visit to the website by the customer. Using the information stored via the cookie, the website knows the customer's email address and includes the email address in the information sent to the contact handling system when the "Call Me" button is selected. The contact handling system contains a database of social network users that have formed a connection with the company on social network sites. The contact handling system queries the database using the customer's known email address. The customer's database record is found and the customer's phone number is returned. The company website displays the customer's phone number with a message "would you like us to contact you at this number?" with selections including "Yes" and "No—enter another number." The customer selects "Yes" and the contact handling system calls the customer to begin a contact.

10. Example Architecture

The embodiments described herein may include the use of a special purpose or general-purpose computer including various computer hardware or software modules, as discussed in greater detail below.

Embodiments within the scope of the present invention also include tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

FIG. 8 and the following discussion are intended to provide a brief, general description of a suitable computing environment in which several embodiments may be implemented. For example, referring to FIG. 1, FIG. 8 may illustrate an example of various components of an agent workstation 145, a customer computing device connected to a network 140, and/or a control server 135, media server 100, ACD 105, IVR, or other device. FIG. 8 can also illustrate a means and steps for accomplishing various functionality and acts disclosed herein. For example, FIG. 8 as a specially programmed computer can illustrate a means for opening media connection paths, closing media connection paths, determining that confidential communication is to be provided, transitioning between media, communicating over parallel media, determining contact information for a customer using social media, performing machine translation, identifying language type from received communication, performing speech synthesis and/or speech recognition as well as other acts and algorithms disclosed herein. FIG. 8 can also illustrate a means for sending and receiving various media, including but not limited to: faxes, instant message chat, electronic mail, landline phone calls, mobile phone calls, Voice over IP calls, SMS messages, MMS messages, social media communication, video calls, teleconferencing, videoconferencing, etc. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps disclosed herein.

Those skilled in the art will appreciate that the embodiments illustrated herein may be practiced in network computing environments with many types of computer system configurations, including personal computers, hand-held devices, mobile phones, multi-processor systems, microprocessor-based or programmable consumer electronics, network PCs, minicomputers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 13, an example of a contact handling system for implementing several embodiments is illustrated, which includes a general purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824. Such components, or similar components, may also embody a workstation for a company representative.

The computer 820 may also include a magnetic hard disk drive 827 for reading from and writing to a magnetic hard disk 839, a magnetic disk drive 828 for reading from or writing to a removable magnetic disk 829, and an optical disk drive 830 for reading from or writing to removable optical disk 831 such as a CD-ROM, DVD, or other optical media. The magnetic hard disk drive 827, magnetic disk drive 828, and optical disk drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the environment described herein employs a magnetic hard disk 839, a removable magnetic disk 829 and a removable optical disk 831, other types of computer readable media for storing data can be used, including magnetic cassettes, flash memory cards, digital versatile disks, Bernoulli cartridges, RAMs, ROMs, millipede memory, and the like.

Program code means comprising one or more program modules may be stored on the hard disk 839, magnetic disk 829, optical disk 831, ROM 824 or RAM 825, including an operating system 835, one or more training and work management programs 836, other program modules 837, and program data 838, such as company representative proficiencies and status. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port, or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, workstations of company representatives, a peer device or other common network node, and typically include many or all of the elements described above relative to the computer 820, although only memory storage devices 850a and 850b and their associated application programs 836a and 836b have been illustrated in FIG. 13. The logical connections depicted in FIG. 13 include a LAN 851 and a WAN 852 that are presented here by way of example and not limitation. Such networking environments are commonplace in office-wide or enterprise-wide computer networks, intranets and the internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 for serially transitioning between media types, adding a slower expected communication rate to contacts, opening and closing parallel communication paths, submitting confidential communication, employing machine translation, and employing social media to facilitate contacts.

Features from any of the disclosed embodiments may be used in combination with one another, without limitation. In addition, other features and advantages of the present disclosure will become apparent to those of ordinary skill in the art through consideration of the detailed description and the accompanying drawings. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improving transmission and confidentiality of sensitive information in a contact handling system via limiting the ability of an agent to access the sensitive information transmitted from a customer to the contact handling system over the course of a contact, the method comprising:
   communicating with the customer via one or more contact handling system devices at the contact handling system via a first media channel including a first media, the first media channel associated with a first customer device, wherein communication received from the customer via the first media channel is communicated to the agent and wherein communication from the agent to the customer is communicated to the customer via the first media channel and the first customer device; and
   receiving the sensitive information from the customer via the one or more contact handling system devices at the contact handling system via a second media channel including a second media including a Short Message Service message, the second media channel associated with a second customer device, wherein:
      as the sensitive information is received via the second media channel, communication received from the customer via the first media channel is communicated to the agent;
      the sensitive information is not accessible by the agent; and
      the customer and agent continue to communicate via the first media channel while or after the sensitive information is received by the contact handling system.

2. The method of claim 1, wherein the contact handling system further includes:
   an agent workstation, which allows the agent to interact with customers, media, and the contact handling system;
   a media server, which handles connection paths for media; and
   an automatic contact distributor, which tracks the state of contacts and agents, the automatic contact distributor supplying available agents with waiting media.

3. The method of claim 2, wherein the contact handling system further includes:
an interactive voice response unit, which provides pre-recorded audio prompts to incoming voice media.

4. The method of claim 2, wherein the second media opens a browser window comprising text fields for entry of the sensitive information by the customer for confidential receipt.

5. The method of claim 1, further comprising:
sending a separate communication from the contact handling system to the customer via the second media channel, wherein the sensitive information received at the contact handling system is sent by the customer in reply to the separate communication.

6. The method of claim 1, further comprising:
sending a confirmation communication from the contact handling system to the customer indicating the sensitive information has been received by the contact handling system.

7. The method of claim 1, further comprising:
sending a confirmation communication to the agent indicating the sensitive information has been received by the contact handling system.

8. The method of claim 1, further comprising:
sending a confirmation communication from the contact handling system indicating the sensitive information has been received by the contact handling system, wherein the confirmation communication includes an identifying portion of the sensitive information.

9. The method of claim 1, wherein the sensitive information includes payment account information.

10. The method of claim 1, wherein the sensitive information includes a social security number.

11. A tangible non-transitory computer readable medium having encoded thereon computer-executable instructions which, when executed by a computer, cause the computer to perform the method of claim 1.

12. The method of claim 1, wherein:
the first customer device is a landline telephone, and
the second customer device is a computer.

13. The method of claim 1, wherein:
the first customer device is a computer, and
the second customer device is a mobile phone.

14. The method of claim 1, wherein:
the first customer device is a landline telephone, and
the second customer device is a mobile phone.

15. A method for improving secure handling of sensitive information sent by a customer to a contact handling system including an agent workstation, a media server, an automatic contact distributor by limiting agent access to the sensitive information, a computer, and a tangible non-transitory computer readable medium having encoded thereon computer-executable instructions which, when executed by the computer, cause the computer to perform the method comprising:
opening a first media channel between the customer and an agent, the first media channel associated with a first customer device, wherein all of the communication received via the first media channel from the customer is available to the agent, and communication sent by the agent via the first media channel is available to the customer;
exchanging communication between the customer and the agent via the first media channel during a contact;
opening a second media channel with the customer, the second media channel associated with a second customer device, including sending a separate communication to the customer via the second media channel, wherein communication received via the second media channel from the customer includes a Short Message Service message not made available to the agent; and
receiving sensitive information from the customer via the second media channel during the contact, wherein the sensitive information is received from the customer in response to the separate communication.

16. The method of claim 15, further comprising:
sending a confirmation communication to the customer indicating the sensitive information has been received by the contact handling system.

17. The method of claim 15, further comprising:
sending a confirmation communication to the agent indicating the sensitive information has been received by the contact handling system.

18. The method of claim 15, further comprising:
sending a confirmation communication to the agent indicating the sensitive information has been received by the contact handling system wherein the confirmation communication includes an identifying portion of the sensitive information.

19. A contact handling system comprising:
an agent workstation, which allows an agent to interact with customers, media, and the contact handling system;
a media server, which handles connection paths for media;
an automatic contact distributor, which tracks the state of contacts and agents, supplying available agents with waiting media; an electronic processor;
a tangible non-transitory computer readable medium having executable instructions stored thereon for performing a method for improving handling of sensitive information, the method including:
opening a first connection path between a customer and the contact handling system via the media server, the first connection path associated with a first customer device, wherein communication received from the customer via the first connection path is available to the agent via the agent workstation, and wherein communication sent via the first connection path is available to the customer;
sending communication to, and receiving communication from the customer during a contact;
opening a second connection path between the customer and the contact handling system via the media server, the second connection path associated with a second customer device, including sending a separate communication to the customer via the second connection path, wherein communication received via the second connection path from the customer includes a Short Message Service message not available to the agent; and
receiving sensitive information from the customer via the second connection path during the contact, wherein the sensitive information is sent by the customer in response to the separate communication;
wherein, while the second connection path associated with the second customer device is open, all communication received from the customer via the first connection path associated with the first customer device is available to the agent via the agent workstation.

* * * * *